(12) United States Patent
Orcutt et al.

(10) Patent No.: US 8,949,781 B1
(45) Date of Patent: Feb. 3, 2015

(54) INJECTING FEATURES INTO AN APPLICATION

(75) Inventors: Jason Eugene Orcutt, San Bruno, CA (US); Amir Elaguizy, Austin, TX (US)

(73) Assignee: Zynga Inc., San Francisco, CA (US)

( * ) Notice: Subject to any disclaimer, the term of this patent is extended or adjusted under 35 U.S.C. 154(b) by 486 days.

(21) Appl. No.: 13/270,157

(22) Filed: Oct. 10, 2011

Related U.S. Application Data

(60) Provisional application No. 61/574,917, filed on Aug. 10, 2011.

(51) Int. Cl.
*G06F 9/44* (2006.01)

(52) U.S. Cl.
CPC .................................... *G06F 8/34* (2013.01)
USPC ........................................................ 717/109

(58) Field of Classification Search
CPC ............ G06F 8/20; G06F 8/30; G06F 9/4421
USPC ................................................. 717/104–119
See application file for complete search history.

(56) References Cited

U.S. PATENT DOCUMENTS

| | | | |
|---|---|---|---|
| 6,683,629 B1 | 1/2004 | Friskel et al. | |
| 6,871,348 B1 | 3/2005 | Cooper | |
| 7,779,085 B2 | 8/2010 | Neil et al. | |
| 8,056,047 B2 * | 11/2011 | Lucas et al. | 717/104 |
| 8,131,799 B2 | 3/2012 | Landsman et al. | |
| 2003/0191865 A1 | 10/2003 | De Armas et al. | |
| 2007/0100653 A1 | 5/2007 | Ramer et al. | |
| 2008/0163270 A1 | 7/2008 | Mitrov et al. | |
| 2008/0200161 A1 | 8/2008 | Morse et al. | |

FOREIGN PATENT DOCUMENTS

WO WO-2013023143 A1 2/2013

OTHER PUBLICATIONS

Brad Wilson, "Partial Rendering & View Engines in ASP.NET MVC", 2008, Wayback Machine on http://bradwilson.typepad.com/blog/2008/08/partial-renderi.html, 18 pages.*
"U.S. Appl. No. 13/270,150, Response filed Jul. 5, 2013 to Non Final Office Action mailed Mar. 4, 2013", 13 pgs.
"U.S. Appl. No. 13/270,150, Final Office Action mailed Jul. 18, 2013", 17 pgs.
"U.S. Appl. No. 13/270,150, Non Final Office Action mailed Mar. 4, 2013", 17 pgs.
"International Application Serial No. PCT/US2012/050342, Search Report mailed Nov. 5, 2012", 2 pgs.
"International Application Serial No. PCT/US2012/050342, Search Report mailed Nov. 5, 2012", 5 pgs.

(Continued)

*Primary Examiner* — Ted T Vo
(74) *Attorney, Agent, or Firm* — Schwegman Lundberg & Woessner, P.A.

(57) ABSTRACT

A method of injecting a feature into an application is disclosed. A definition of the feature of the application is received. It is determined that the feature is an injection feature of a view of the application. It is detected that an instance of the view of the application is being instantiated. The feature is injected into the view of the application based on the determining that the feature is the injection feature of the view of the application and the detecting that the instance of the view of the application is being instantiated.

14 Claims, 28 Drawing Sheets

(56) References Cited

OTHER PUBLICATIONS

"U.S. Appl. No. 13/270,150, Response filed Nov. 18, 2013 to Final Office Action mailed Jul. 18, 2013", 9 pgs.

"International Application Serial No. PCT/US2012/050342, International Preliminary Report on Patentability mailed Feb. 20, 2014", 7 pgs.

* cited by examiner

```
1800 zp.feature.exampleInject = z.extend(new zp.feature.FeaturePackage ('zp.feature.exampleInject'), /**
 * Handles the installation of the package. Instantiates views.
 * @memberOf zp.feature.exampleInject
 */
installer: function() {
    zp.log("ExampleInject installer called!");

zp.feature.FeaturePackage.prototype.installer.call (this);

zp.base.createView(zp.feature.exampleInject._InjectedView, 'InjectedViewInstance
}
});
```

FIG. 18A

```
1860 zp.feature.exampleExtend = z.extend(new zp.feature.FeaturePackage ('zp.feature.exampleExtend'),
    installer: function() {
        zp.log ("ExampleExtend installer called!");

// Stash the old view reference in the feature package
        zp.feature.exampleExtend._prevTableView = zp.coreGame.view.DemoTableView;

// Replace the definition of DemoTableViedw with our ExtendedView
        zp.coreGame.view.DemoTableView = zp.feature.exampleExtend.ExtendedView;

//success register!
        zp.feature.FeaturePackage.prototype.installer.call(this);
    }
});
```

FIG. 18B

```
Levers: {
  features: {
    leaderBoard: {
      preload: true,
      extends: 'zp.coreGame.lobby.LobbyView',
    },
    exampleExtend: {
      extends: 'zp.coreGame.lobby.LobbyView'
    },
    exampleInject: {
      injects: 'zp.lobbyInstance'
    }
  }
}
```

1. Create view using zp.base.createView
   * Pass in the models

```
   var viewInstance = zp.base.createView (MyView, 'myInstance', importantModel);
   ```

2. View constructor will be called
   * Be sure to call parent view's constructor
     * pass in the view's instance name, component name (normally the last component of package) and class name, model and templates/css (if any)

```
   zp.base.PokerView.call (this, instanceName, 'sweetControls', model, 'mySwetTemplate.tpl',
   ...
   );
   ```

3. View initialize will be called
   * Parent initialize should be immediately called

```
   z.extend (MyView.prototype, zp.base.PokerView.prototype, {
       initialize: function() {
           zp.base.PokerView.initialize.call (this);
           // My initialize
           ...
       },
       ...
   });
   ```

* Will return when all asset dependencies have been loaded
   * This is where view initialization should occur
     * setting positions, text, etc
     * Adding any subviews

1. In parent create the subview, most likely in the initialize function
2. Then add the view to the parent
    • Give the view instance a unique name

```
initialize: function() {
    zp.base.PokerView.initialize.call(this);

var myView = zp.base.createView (zp.features.sweetControls.MySweetButton, 'sweetButtonInstance', in
    this.addView(myView);
},
```

1. Create your feature view

```
zp.feature.exampleInject.MySweetButton = function(options) {
    zp.controls.Button.call.this(...)
};
z.extend(zp.feature.exampleInject.MySweetButton.prototype, zp.controls.Button.prototype, {
    initialize: {
        zp.controls.Button.initialize.call(this);
        this.label = 'My Funny Button';
    }
});
```

2. Create your package and installer
 • Do your injection in the installer

```
zp.feature.exampleInject = new Package ('zp.feature.exampleInject');
z.extend(zp.feature.exampleInject, {
    installer: function() {
        var targetInstance = zp.feature.Helper().findInstance('zp.lobby.instance');
        var myButtonInstance = zp.base.createView(zp.feature.exampleInject.MySweetButton, 'sweetInst
        tagetInstance.addView(myButtonInstance);
    }
});
```

3. Now make sure your feature is defined in the levers and you're GTG!

FIG. 22

INJECTING FEATURES INTO AN APPLICATION

CROSS-REFERENCE TO RELATED APPLICATIONS

This application claims the benefit of U.S. Provisional Application No. 61/574,917, filed Aug. 10, 2011, entitled "INJECTING FEATURES INTO AN APPLICATION," which is incorporated herein by reference in its entirety.

TECHNICAL FIELD

The present application relates generally to the technical field of implementing software applications, and, in one specific example, to enhancing a software application development framework to enable a software developer to develop a feature that is injected into a view of an application based on capabilities of a client device on which the application is executing.

BACKGROUND

During execution of a software application, such as a client-server application or a web application, a server may send one or more instructions to a client that are to be executed by a client application (e.g., a web browser) executing on a device. For example, the server may send one or more client-side scripts in a scripting language (e.g., JavaScript) that are to be executed by the client application in order to make the software application more interactive (e.g., to support dynamic Hyper Text Markup Language (DHTML)). Although such instructions may be embedded within a document (e.g., an HTML document) that is generated dynamically by the server upon execution of a server-side script, the instructions themselves may pertain to features of the application that are not appropriate for the device (e.g., that require a capability that the device does not possess) or that are not appropriate for the user of the device (e.g., that a user does not wish to use). In such cases, the client application may conditionally execute portions of the instructions (e.g., via if/then statements within the instructions). Thus, including the remaining portions of the instructions may be an inefficient use of resources.

BRIEF DESCRIPTION OF THE DRAWINGS

Some embodiments are illustrated by way of example and not limitation in the figures of the accompanying drawings in which:

FIG. 18A is screenshot of a pseudo code that handles the installation of a package for an injection feature;

FIG. 18B is a screenshot of pseudo code that handles the installation of a package for an enhancement feature;

FIG. 20 is a screenshot of pseudo code for initializing a view of an application;

FIG. 21 is a screenshot of pseudo code for creating a sub-view;

FIG. 22 is a screenshot of pseudo code of an injection feature definition that adds a funny button to a lobby of a poker game application;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

A method of injecting a feature into an application is disclosed. A definition of the feature of the application is received. It is determined that the feature is an injection feature of a view of the application. It is detected that an instance of the view of the application is being instantiated. The feature is injected into the view of the application based on the determining that the feature is the injection feature of the view of the application and the detecting that the instance of the view of the application is being instantiated.

Figure 1:
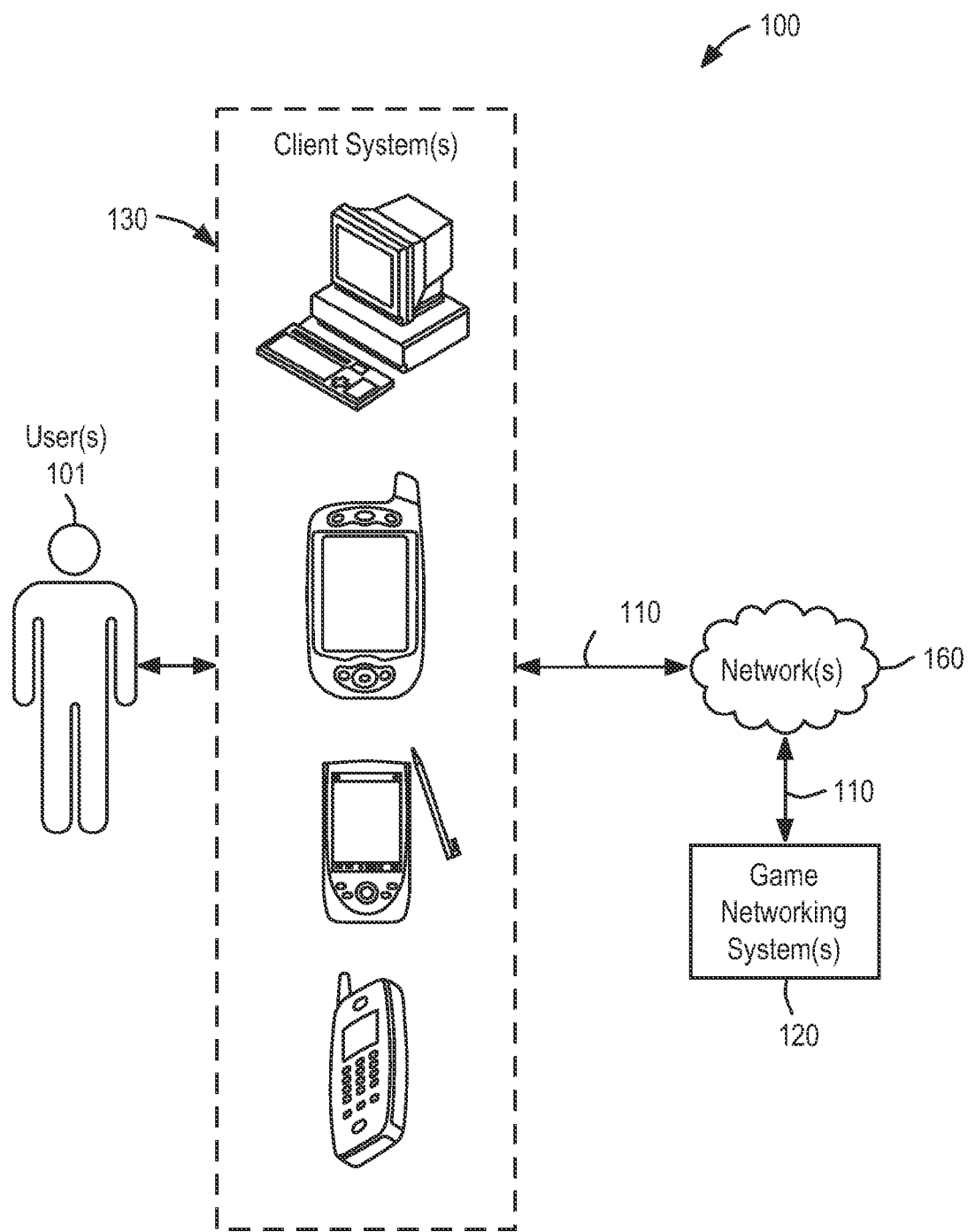
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises user(s) 101, game networking system 120, client system 130, and network 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system 120 is a network-addressable computing system that can host one or more online games. Game networking system 120 can generate, store, receive, and transmit game-related data, such as, for example, game account data, game input, game state data, and game displays. Game networking system 120 can be accessed by the other components of system 100 either directly or via network 160. Player 101 may use client system 130 to access, send data to, and receive data from game networking system 120. Client system 130 can access game networking system 120 directly, via network 160, or via a third-party system. Client system 130 can be any suitable computing device, such as a personal computer, laptop, cellular phone, smart phone, computing tablet, and the like.

Although FIG. 1 illustrates a particular number of players 101, game networking systems 120, client systems 130, and networks 160, this disclosure contemplates any suitable number of players 101, game networking systems 120, client systems 130, and networks 160. Although FIG. 1 illustrates a particular arrangement of player 101, game networking system 120, client system 130, and network 160, this disclosure contemplates any suitable arrangement of player 101, game networking system 120, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, game networking system 120, client system 130, and network 160, this disclosure contemplates any suitable connections between player 101, game networking system 120, client system 130, and network 160. As an example and not by way of limitation, in particular embodiments, client system 130 may have a direct connection to game networking system 120, thereby bypassing network 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system 120, which can be accessed using any suitable connection with a suitable client system 130. A player may have a game account on game networking system 120, wherein the game account can contain a variety of information associated with the player (e.g., the player's personal information, financial information, purchase history, player character state, game state, etc.). In some embodiments, a player may play multiple games on game networking system 120, which may maintain a single game account for the player with respect to all the games, or multiple individual game accounts for each game with respect to the player. In some embodiments, game networking system 120 can assign a unique identifier to each player 101 of an online game hosted on game networking system 120. Game networking system 120 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, or game networking system 120). As an example and not by way of limitation, client system 130 can download client components of an online game, which are executed locally, while a remote game server, such as game networking system 120, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120, which is managed by the game operator. In other embodiments, the social graph is part of a social networking system managed by a third-party (e.g., Facebook, Friendster, Myspace). In yet other embodiments, player 101 has a social network on both game networking system 120 and social networking system, wherein player 101 can have a social network on the game networking system 120 that is a subset, superset, or independent of the player's social network on social networking system. In such combined systems, game network system 120 can maintain social graph information with edge type attributes that indicate whether a given friend is an "in-game friend," an "out-of-game friend," or both. The various embodiments disclosed herein are operable when the social graph is managed by the social networking system, game networking system 120, or both.

Figure 2:
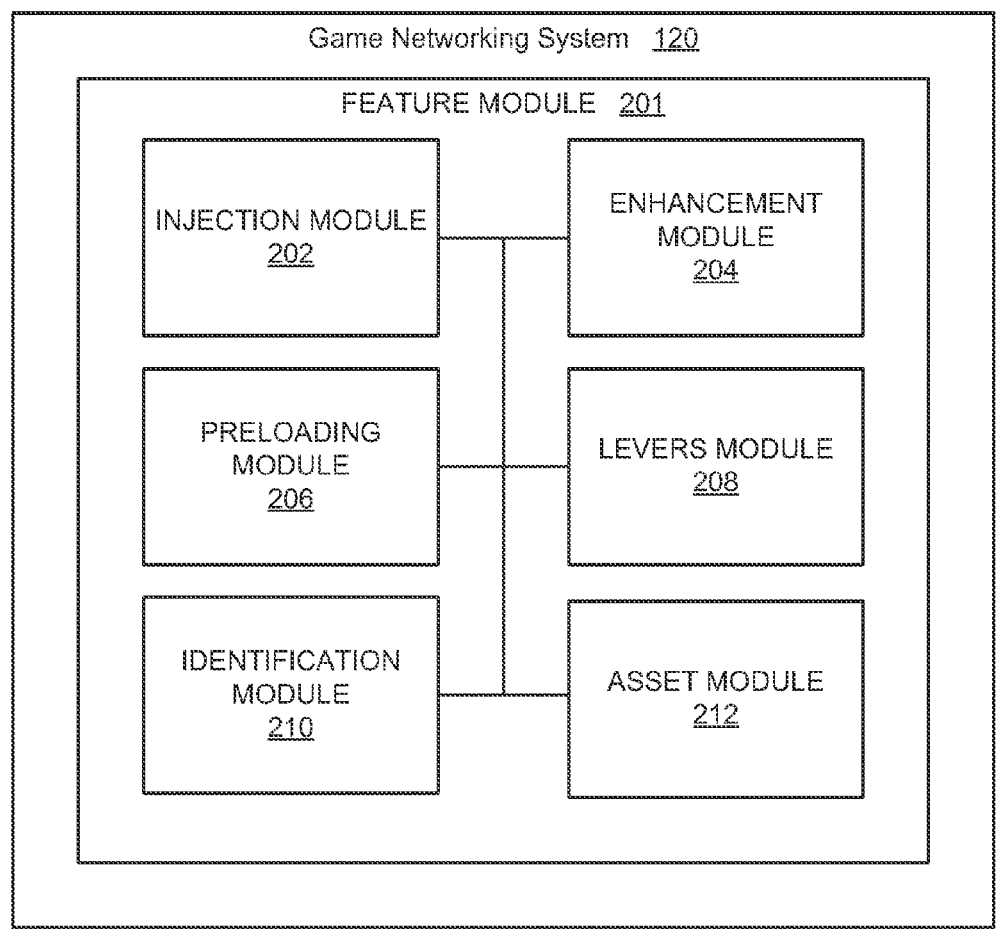
FIG. 2 is a block diagram illustrating an example feature module of the game networking system of FIG. 1 that is configured to incorporate features into an application.

FIG. 2 is a block diagram illustrating an example feature module 201 of the game networking system 120 that is configured to incorporate features into an application.

A feature may be defined using a traditional model-view-controller (MVC) software architecture or a variation of the traditional MVC software architecture. For example, a feature may be defined by one or more view objects that define the view for the feature (e.g., render a user interface that enables a user to interact with the feature). For example, a view may implement logic for displaying an HTML/XHTML template or a cascading style sheets (CSS) template. However, unlike view objects in a traditional MVC architecture, the view objects may receive user input, initiate a response to the user input by making calls on model objects, or perform other operations that would traditionally be handled by controller objects. A view object may implement event handlers for manipulating model objects, views, or sub-views. A view object may listen for changes to the model (e.g., received from model objects). A view may be given a name when it is instantiated. The name may be used to store the view or sub-views of the view and reference them later.

A feature may also be defined by one more model objects configured to manage data of an application (e.g., respond to instructions to change a state of the application). For example, a model object for an application for a game may include data related to a state of the game. The data may be partitioned into models and sub-models. Each model or sub-model may have a name. The data may be stored in a simple key/value store. In various embodiments, the keys may be declared at design time; therefore, the feature module 201 may enforce a rule that values may be added to a model at run-time, but no new keys may be added to the model at run-time. The model object may allow callback registration for model changes.

A feature may also be defined by one or more controller objects. Unlike controller objects in the traditional MVC architecture, the controller objects may be responsible for such tasks as browser history management and Uniform Resource Locator (URL) routing. Thus, the controller objects may enable breadcrumbs to work with a browser history. For example, if a user of an application for a poker game (e.g., Zynga Poker) accesses a points screen from a lobby screen of the poker game, the user may be able to return to the lobby using the browser's history (e.g., by pressing the browser's "back" button). In various embodiments, a feature may be defined by a variation of an MVC software architecture that is based on a JavaScript MVC framework, such as Backbone.js.

The objects defining a feature may be included in a package corresponding to the feature. A package may be an object configured to contain portions of related functionality. The package may be created by instantiating or extending a package base class. A package may have a name. For example, a name of a package may be "zp.feature.<FEATURE NAME>", where "zp.feature" is a name of a package base class that the package extends and "<FEATURE_NAME>" represents a name of the feature.

A package may include a single namespace (e.g., to separate objects included in the package from objects included in other packages). The package may contain object instances (e.g., global singletons), class definitions, other packages, aliases (e.g., simple assignments that allow a meta-item within a package for the purpose of easily changing a type of n exposed interface, namespace functionality (e.g., zp.info for logging), or pre-loader information. Packages may be primarily for organization; therefore, they may not contain variables, data, state information, and so on. An example of pseudo code for a package declaration for an application for a poker game (e.g., Zynga Poker) may be "zp.core.PokerGlobal=zp.core.PokerGlobal||new Package ('zp.core.pokerGlobal');" (e.g., to be included at the top of a class file). An example of pseudo code for a package singleton declaration may be "zp.core.pokerGlobal.User=new_singletoneConstructor ( ); //Constructor".

In various embodiments, a feature may be responsible for installing itself into the application. Thus, a feature may also be defined by a loader function that handles the installation of the feature into the application.

The feature module 201 includes an injection module 202 that is configured to incorporate an injection feature into an application. An injection feature may be a feature that includes a sub-view of a view of an application that is injected into the view of the application (e.g., when an instance of the view of the application is created). Here the view may be a view as it is defined in an MVC architecture. An example of an injection feature may be a button (e.g., a funny button) that is injected into a lobby view of a poker game application, such as Zynga Poker. The injection module 202 may inject the injection feature based on the application creating an instance (e.g., a first instance) of the view of the feature the application into which the injection feature is to be injected. In other words, the injection module 202 may load an injection feature lazily. In various embodiments, the injection module 202 may not need to load the injection feature again when the application creates additional instances of the view. Additionally, the injection module 201 may inject the injection feature based on levers (described in more detail below).

The feature module 201 includes an enhancement module 204 that is configured to incorporate an enhancement feature into an application. An enhancement feature may be a feature that includes a view that is to serve as a replacement view for a current view of an application. An example of an enhancement feature may be a feature that includes new lobby view of a poker game that rotates when an orientation of a device accessing the poker game changes, replacing a current lobby view of the poker game that does not rotate when an orientation of the device accessing the poker game changes. The enhancement module 204 may incorporate the enhancement feature into the application based on a detection that the application is about to load the current view of the feature.

Additionally, the enhancement module 204 may incorporate the enhancement feature into the application based on levers (described in more detail below).

The feature module 201 includes a preloading module 206 that is configured to preload a feature of an application based on a determination that the feature is to be loaded (e.g., into a memory of the application) before the application needs information pertaining to the feature (e.g., to communicate instructions for presenting the feature to a user of the application). For example, the preloading module 206 may preload a definition of a feature based on a detecting that the application is being started or that the application is being loaded into a memory.

The feature module 201 includes a levers module 208 that is configured to determine whether or how a feature is to be incorporated into an application. For example, the levers module 208 may determine whether or how a feature is to be incorporated into an application based on information about a device accessing the application (e.g., a type of a device on which the feature is to be rendered) or information about a user of the application (e.g., preferences of the user). In various embodiments, the levers module 208 may determine whether or how a feature is to be incorporated into an application based on a processing of a levers object that includes tags specifying a type of the feature (e.g., whether the feature is an injection feature or an enhancement feature) with respect to a view of the application or whether the feature is to be preloaded. For example, a tag may specify that a feature is an injection feature of a first view of the application and an enhancement feature of a second view of the application. In other words, a feature may be an extension feature and an injection feature. Furthermore, a tag may specify that a feature is to be preloaded independently of whether the feature is an injection feature or an enhancement feature.

The feature module 201 includes an identification module 210 that is configured to identify information about a device (e.g., the client system 130) that is accessing an application or a user that is accessing the application. For example, the identification module 210 may be configured to identify a type of the device (e.g., an iPhone or a Blackberry), a version of the device (e.g., an iPhone 3G, an iPhone 3GS, or an iPhone 4), a version of an operating system executing on the device (e.g., Apple iOS 3.2.2 or Apple iOS 4.3.5), or a locale (e.g., represented by Internet Engineering Task Force (IETF) language tags, such as language tags defined by a Best Current Practice (BCP) standard track) supported by the device. As another example, the identification module 210 may be configured to identify whether a user is a member of a group (e.g., a flow group), such as a group of users who have volunteered to test new features of the application or a group of users who are selected as test subjects for new features of the application. Thus, as one example, a lever for a particular feature may be "on" for an iPhone 3 device, but "off" for an iPhone 4 device).

Figure 19:
FIG. 19 is a screenshot of pseudo code for a lever object that tags various features as being injection features or enhancement features for a view of the application.

The levers module 208 may load the levers object before the application is executed. The levers object may not be compiled into the application. The levers object may be a JSON object. An example levers object is depicted in FIG. 19.

The feature module 201 includes an asset module 212 that is configured to manage assets associated with an application. Examples of assets may includes images, sound files, template files (e.g., .TPL files, files that hold pre-formed document object model (DOM) objects with optionally embedded cascading style sheets (CSS). Assets may be arranged into a directory structure. For example, assets for the lobby of a poker game application may be stored in an /assets/lobby directory. The directory structure may be organized by locale, such that assets for U.S. users are stored in a directories having a /lobby/in prefix, such as /lobby/en/templates, lobby/en/css/, and so on, whereas as assets for German users are stored in directories having a /lobby/de prefix, such as /lobby/ge/templates, lobby/ge/css, and so on. Furthermore, assets for features in addition to the lobby feature of the application may be stored in a different directory structure. For example, assets for a leader board feature may be stored in an /assets/leaderboard/directory.

A sample client and CSS URI structure for core non-feature components of an application may include /lobby/de/images/<imagename>, /lobby/de/template/<templatename>, and /lobby/en/sounds/<soundFileName>, structures. A sample client and CSS URI structure for feature components of an application may include /leaberboard/images/<imagename>, where leaderboard represents the name of a leaderboard feature. These URIs may be translated by an htaccess and a PHP fulfiller.

Assets may be resolved from most specific to least specific. For example, on a phone running Android 2.1 with the de locale, lobby images may be resolved in this order: (1) /lobby/de/android/2.1/images, (2) /lobby/de/android/images/, (3) /lobby/de/images/, (4) /lobby/en/android/2.1/images, (5) /lobby/en/android/images/, (6) /lobby/en/images/, and (7)<FAIL>. The client and CSS may specify an image in the above configuration as lobby/de/images/image1.png. The post URL after mod_rewrite would become: "mobile_asset.php?component=lobby&type=image&filename=image1.png&locale=de" Here, the order of the check may be (1) Device+Device Version+Locale, (2) Device+Locale, (3) Locale, (4) Device+Device Version+Default Locale, (5) Device+Default Locale, (6) Default Locale, and <FAIL>.

An asset loader may ensure that assets are fully loaded when they are needed. Example definitions of primary interfaces for the asset loader may be "getTemplate('lobby', 'lobby.tpl', function(err) { });" and "getCss('lobby', 'lobby.tpl', function(err) { });".

A line of interfaces for individual may not be used as images may be automatically loaded if they are referenced in CSS. Referencing the images in CSS may automatically bundle them together with the features/components which use them. Notifications may result only when a stylesheet is fully loaded, including all referenced images. An interface may be used for preloading the assets. A sample of a definition for an individual asset interface may be "getImage('lobby', 'image1.png', function(err) { });". A sound manager may be configured to manage sound assets, and may take an array of URLs as parameters.

Asset preloading may not be the same as feature pre-loading. Feature pre-loading may be a mechanism to get features (e.g., javascript) loaded at startup, such as particularly important features. Asset preloading may be done on a per-package basis. Any package may have a preload object defined that supports, for example, four objects, which are arrays: templates, CSS, sounds, and images. Asset preloading may be defined for features as well. Preloading may be handled transparently for both core packages and feature packages. Here is a sample process for core packages: a preloader function (e.g., zp.PreLoader) (1) loads all of the JavaScript for core packages, (2) Calls zp.util.AssetLoader.preloadAssets( ) on each package, and (3) Starts PokerMain. Here is a sample process for feature packages: a loader function (e.g., zp.feature.Loader) (1) loads the javascript for a package, either during the package source preloading or during package lazy-loading, (2) calls zp.util.AssetLoader.preloadAssets on the loaded feature package, and (3) Returns or calls feature installer as appropriate. The core pseudo code may be similar to the pseudo code described with respect to FIG. 19.

Figure 3:
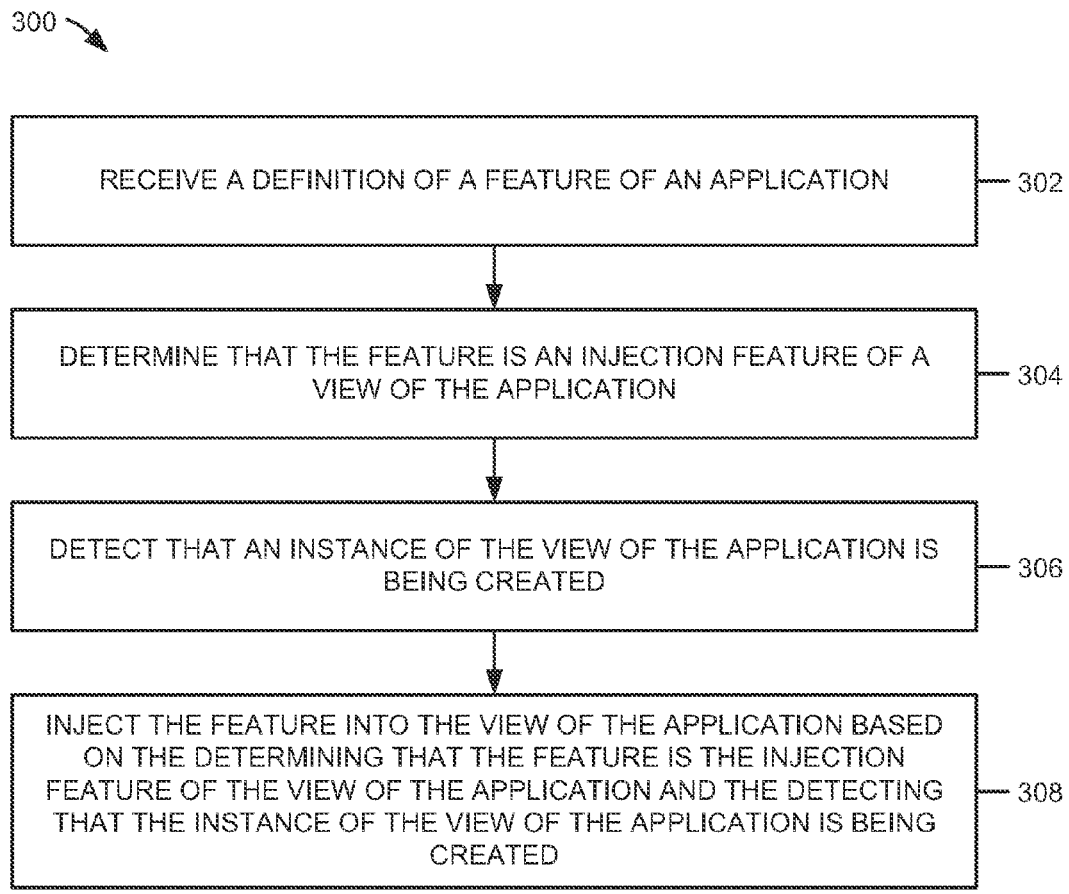
FIG. 3 is a flowchart illustrating an example embodiment of a method of incorporating an injection feature into an application.

FIG. 3 is a flowchart illustrating an example embodiment of a method 300 of incorporating an injection feature into an application. At operation 302, the levers module 208 receives a definition of a feature of an application. The definition may be embodied as one or more objects, including one or more view objects. The definition may be included in a package corresponding to the feature.

At operation 304, the levers module 208 determines that the feature is an injection feature of a view of the application. The levers module 208 may base this determination on a processing of a levers object that includes a tag (e.g., an "injects" tag) that specifies that the feature is to be injected into the view.

At operation 306, the levers module 206 detects that an instance of the view of the application is being created. For example, the levers module 206 detects that a view object corresponding to a main lobby of an application for a poker game is being created.

At operation 308, the injection module 202 injects the feature into the view of the application based on the determining that the feature is the injection feature of the view of the application and the detecting that the instance of the view of the application is being created. For example, the injection module 202 creates a view object corresponding to the injection feature and adds the view object as a sub-view of the view of the application. The injection module 202 may invoke an installer of the feature to inject the feature into the application. The installer may be included in a package corresponding to the feature.

Figure 4:
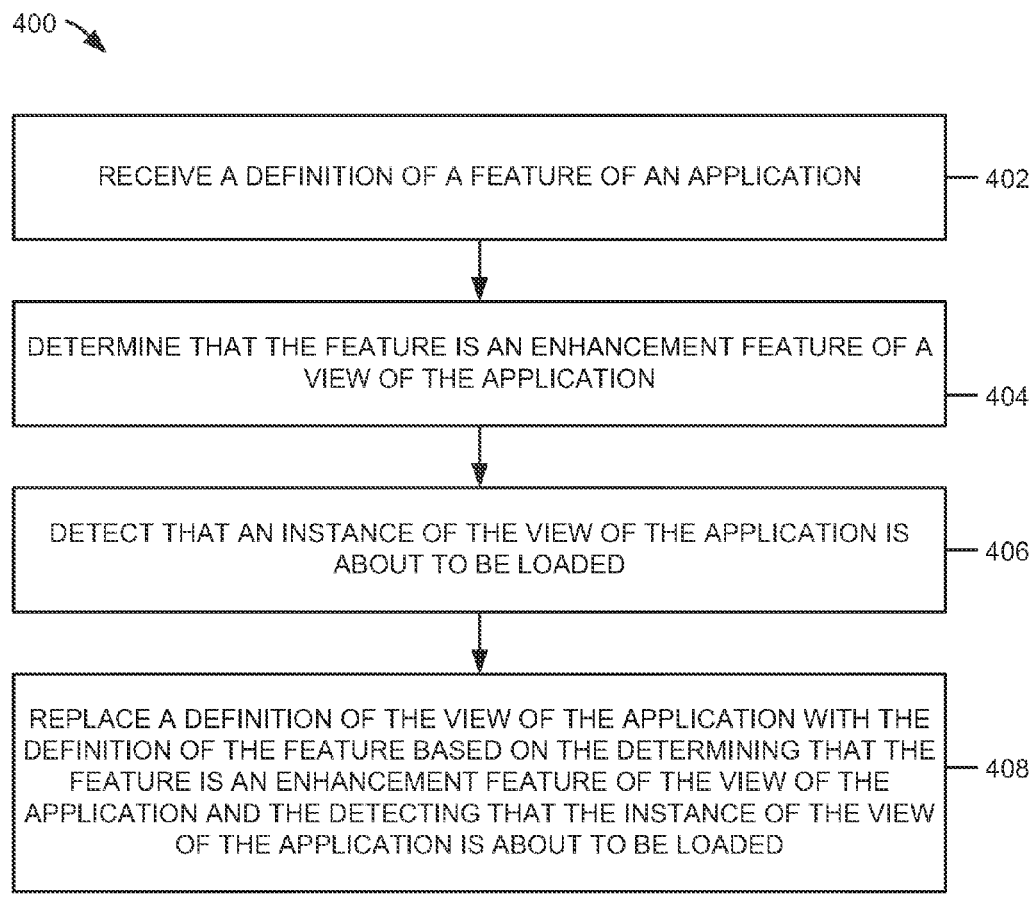
FIG. 4 is a flowchart illustrating an example embodiment of a method of incorporating an enhancement feature into an application.

FIG. 4 is a flowchart illustrating an example embodiment of a method 400 of incorporating an enhancement feature into an application. At operation 402, the levers module 208 receives a definition of a feature of an application. The definition may be embodied as one or more objects, including one or more view objects. The definition may be included in a package corresponding to the feature.

At operation 404, the levers module 208 determines that the feature is an enhancement feature of a view of the application. The levers module 208 may base this determination on a processing of a levers object that includes a tag (e.g., an "enhances" tag) that specifies that the feature is to enhance the view.

At operation 406, the levers module 206 detects that an instance of the view is about to be loaded. For example, the levers module 206 detects that a first instance of a main lobby of an application for a poker game object corresponding to a main lobby of a poker game is about to be created.

At operation 408, the enhancement module 204 replaces some or all of a definition of the view of the application with the definition of the feature based on the determining that the feature is the enhancement feature of the view of the application and the detecting that the instance of the view of the view is about to be loaded. For example, the enhancement module 204 may replace a view object of a current view of the application with a view object of the enhancement feature based on a determination that a first instance of the current view of the application is about to be loaded.

Figure 5:
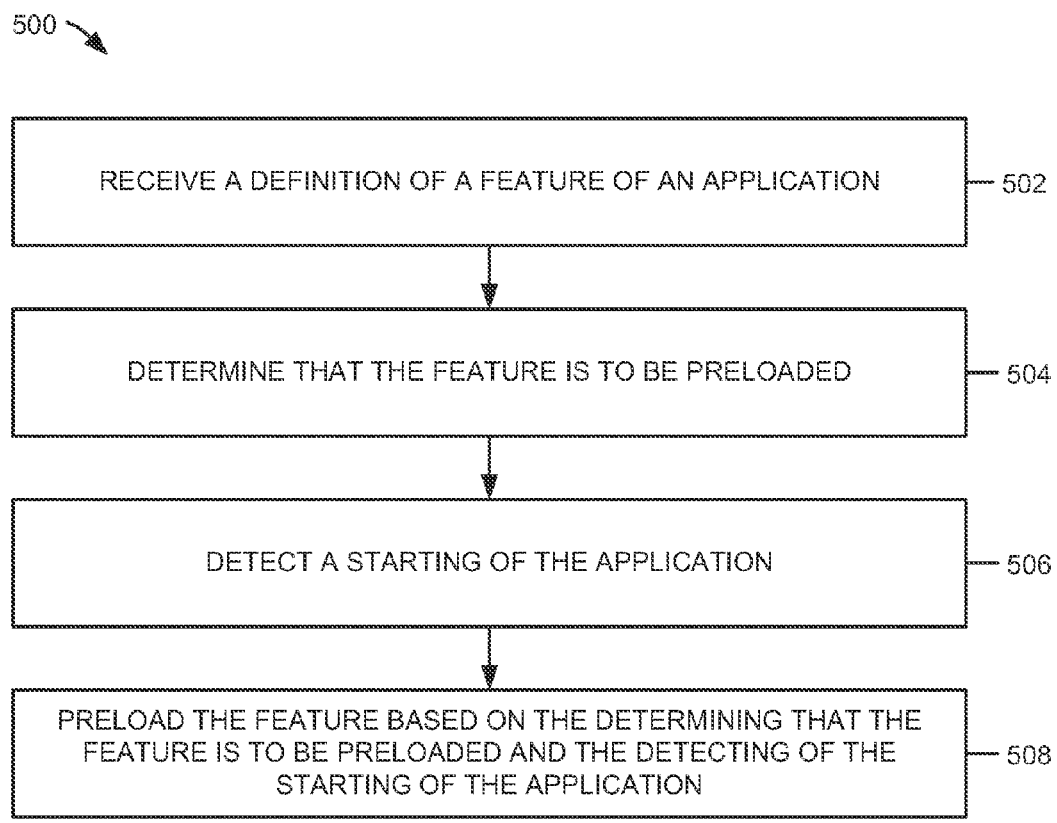
FIG. 5 is a flowchart illustrating an example embodiment of a method of preloading a feature of an application.

FIG. 5 is a flowchart illustrating an example embodiment of a method 500 of preloading a feature of an application. At operation 502, the levers module 208 receives a definition of the feature. The definition may be embodied as one or more objects, including one or more view objects. The definition may be included in a package corresponding to the feature.

At operation 504, the levers module 208 determines that the feature is to be preloaded. The levers module 208 may base this determination on a processing of a levers object that includes a tag (e.g., a "preload" tag) that specifies that the feature is to be preloaded.

At operation 506, the levers module 206 detects that the starting of the application.

At operation 508, the preloading module 206 preloads the feature based on the determining that the feature is to be preloaded and the detecting of the starting of the application. For example, the preloading module 206 loads the definition of the feature into a memory of the game networking system 120 or instructs the client system 130 to load the definition of the feature into a memory of the client system 130.

Figure 6:
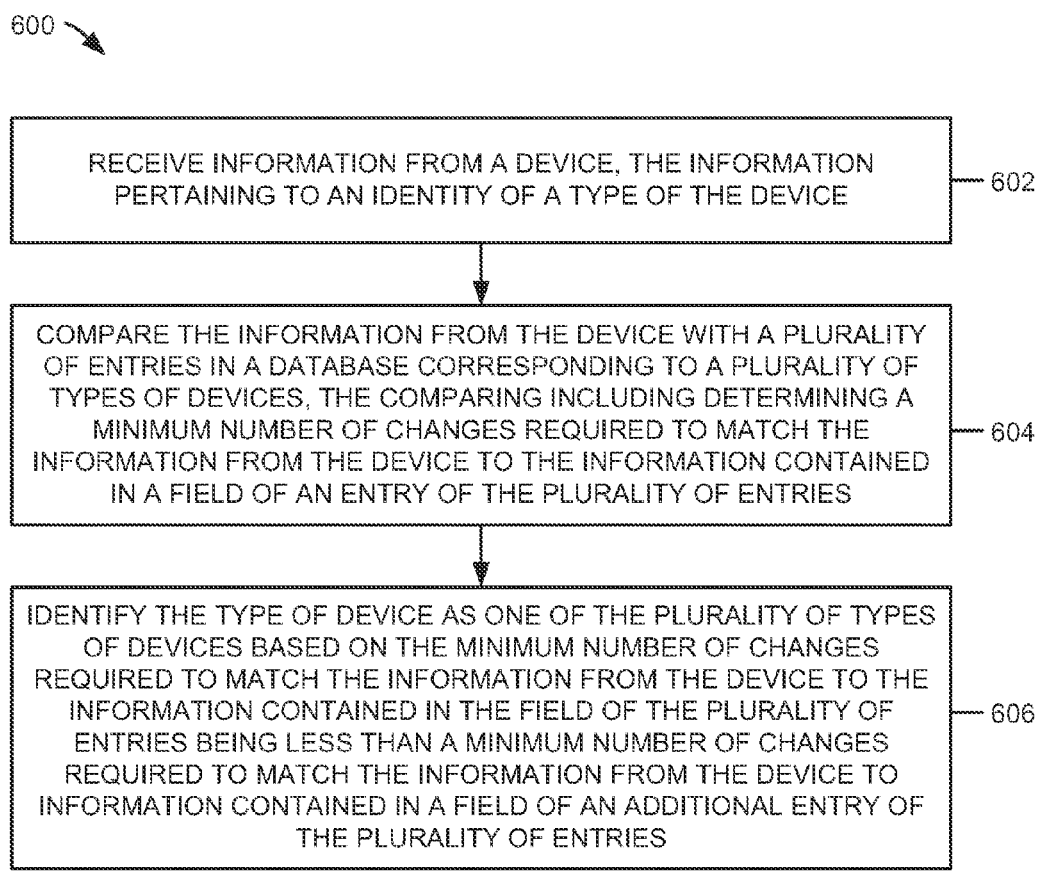
FIG. 6 is a flowchart illustrating an example embodiment of a method of identifying a type of a device (e.g., a client system that is accessing an application)

FIG. 6 is a flowchart illustrating an example embodiment of a method 600 of identifying a type of a device (e.g., the client system 130 that is accessing an application). At operation 602, the identification module 210 receives information from the device. This information may include information pertaining to an identity of a type of the device. For example, the information may include information corresponding to a User-Agent field in a request header, as described in IETF Request for Comments (RFC) 1945. Or the information may include information corresponding to the User Agent Profile (UAProf) specification developed by the World Wide Web Consortium (W3C). Or the information may include information corresponding to the Wireless Universal Resource File (WURFL) developed by the Free and Open Source Software (FOSS) community effort.

In various embodiments, the information may also include information received from an application (e.g., JavaScript) executing on the client device. The application executing on the client device may be configured to gather information about the device (e.g., capabilities of the device, such as display capabilities) and communicate that information to the game networking system 120 (e.g., via the identification module 210).

At operation 604, the identification module 310 compares the information from the device with a plurality of entries in a database corresponding to a plurality of types of devices. The comparing may include using a fuzzy-logic matching algorithm. For example, the comparing may include determining a minimum number of changes required to match the information from the device to the information contained in a field of an entry of the plurality of entries.

At operation 606, the identification module 310 identifies the type of the device as one of the plurality of types of devices based on the minimum number of changes required to match the information from the device to the information contained in the field of the plurality of entries being less than minimum number of changes required to match the information from the device to information contained in a field of additional entries. For example, assume, at operation 602, the identification module 310 receives a string including "iPhone 4XY" from the device. Assume further that a field of a first entry of the plurality of entries includes the string "iPhone 4" and a second entry of the plurality of entries includes the string "iPhone 3." In this case, at operation 606, the identification module 310 may determine that the string received from the device more closely matches the first entry based on a minimum number of changes being two for the field of the first entry (i.e., removing the "X" and the "Y") and three for the field of the second entry (removing the "X" and the "Y" and replacing the "3" with a "4"). Based on this determination the identification module 310 may identify the type of the device based on the database entry corresponding to the first field also containing an additional field corresponding to a type of the device (e.g., an iPhone 4).

Figure 7:
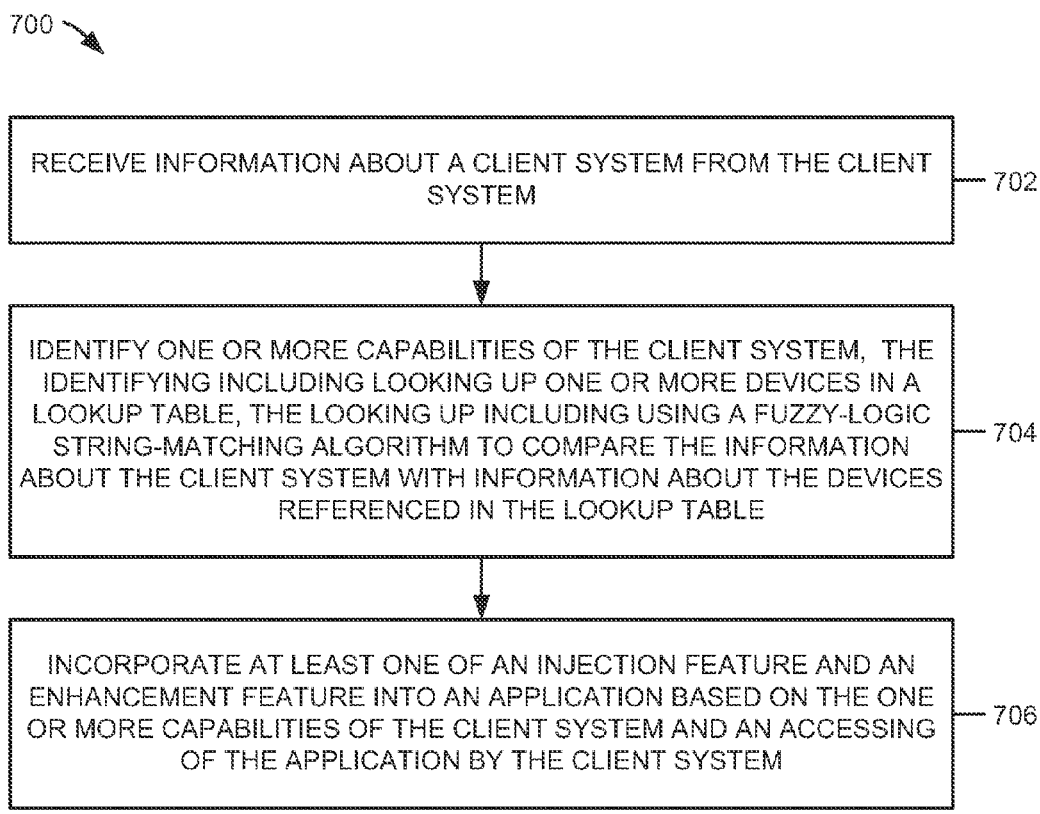
FIG. 7 is a flowchart illustrating an example embodiment of a method of incorporating at least one of an injection feature or an enhancement feature into an application based on the capabilities of a client system that accesses the application.

FIG. 7 is a flowchart illustrating an example embodiment of a method 700 of incorporating at least one of an injection feature or an enhancement feature into an application based on the capabilities of a client system that accesses the application. At operation 702, the identification module 702 receives information about a client system from the client system. The information may pertain to the identity of the client system or capabilities of the client system, as discussed above with respect to FIG. 3 and FIG. 6.

At operation 704, the identification module 210 identifies one or more capabilities of the client system. The identification module 210 may identify the capabilities of the client system by looking up one or more devices in a lookup table. The looking up may include using a fuzzy-logic string-matching algorithm to compare the information about the client system with information about the devices referenced in the lookup table. For example, the looking up may include determining a minimum number of changes required to convert the information about the client system into information that matches a field of an entry in the lookup table, as described above with respect to FIG. 6.

The lookup table may be comprised of combinations of data derived from multiple databases. For example, the lookup table may include entries from various databases used to identify devices (e.g., based on user-agent, a UAProf, or WURFL data). The data from these various databases may be merged, linked, or otherwise consolidated into the lookup table as a single lookup table.

The database may be associated with a configuration area that specifies a hunt order for matching of various attributes of the device, such as matching of a version of a client (e.g., a web browser) executing on the device. The database may then be generated according to the hunt order. For example, the configuration area may specify that entries in the database corresponding to a web-browser version attribute are to be sorted first by web-browser type (e.g., Microsoft Internet Explorer, Mozilla Firefox, Google Chrome, Apple Safari) and then by web-browser version (e.g., in descending order). Thus, the database entries for the web browser type may be sorted such that all of the versions of Microsoft Internet Explorer are listed in descending order followed by all of the versions of Mozilla Firefox listed in descending order, and so on.

As another example, the configuration area may specify that entries in the database corresponding to the web-browser version attribute are to be sorted such that versions of web browsers are interleaved based on, for example, the release dates of the web browser versions. Thus, the database entries for the web browser type may be sorted such that the versions of Mozilla Firefox are interleaved with the versions of Microsoft Internet Explorer based on the release dates of the Web browser versions. The configuration area may be configurable by an administrator of a system, such as an administrator of the database or the game networking system 120. Because the database may be pre-built based on settings in the configuration area, the identification module 210 need not consume CPU resources at run-time to, for example, optimize the order in which matches of device attributes are sought.

The identification module 210 may receive additional information about the device from a bootstrap script (e.g., JavaScript) that was executed on the device. Such additional information may include, for example, window size, operating system, or other information, such as whether a session is an embedded browser session. The identification module 210 may send results of the database matching, including a database matching of attributes of the device (such as the web browser version of the device) to the feature module 301. The identification module 210 may also send the additional information received from the bootstrap script to the feature module 301. Thus, the feature module 301 may determine the capabilities of the device based on a combination of the result of the database matching and the additional information received from the bootstrap script. Because the feature module 301 is provided with the additional information from the bootstrap script, it may be able to identify devices having new combinations of attributes, such as operating system and browser combinations, for which identical matching entries do not exist in the database. Thus, the feature module 301 may be able to identify a particular device without requiring that the database be updated upon the detection of devices having new combinations of device attributes.

At operation 706, the feature module 301 incorporates at least one of an injection feature (e.g., via the injection module 302) and an enhancement feature (e.g., via the enhancement module 304) into an application based on the one or more capabilities of the client system and an accessing of the application by the client system. Thus, the feature module 301 may incorporate a feature into an application for a first device, but not incorporate that feature into the application for a second device, based on the identified capabilities of the first device being different from the identified capabilities of the second device.

Figure 8:
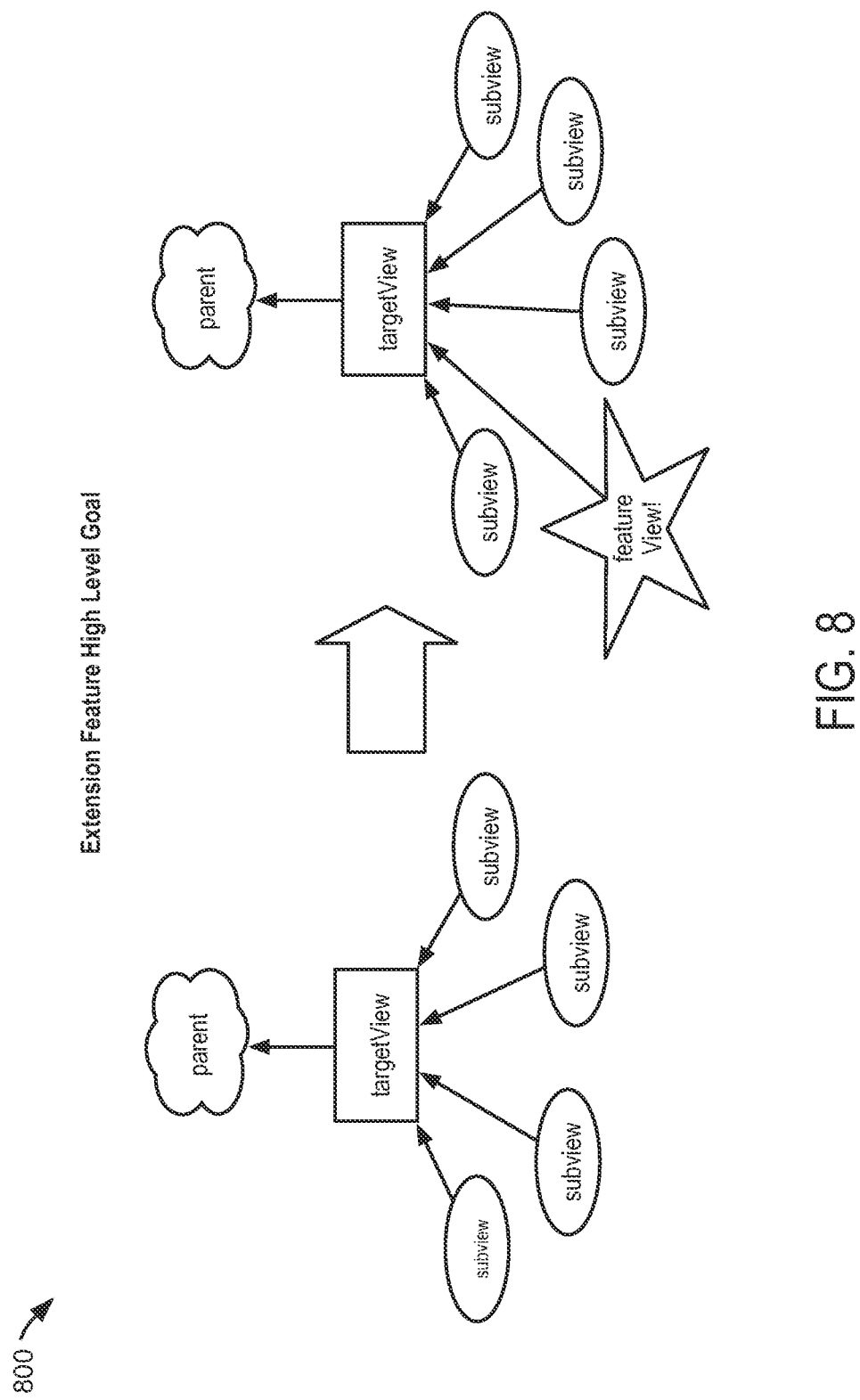
FIG. 8 is a block diagram illustrating an example of a result of the injection module injecting a feature into an application.

FIG. 8 is a block diagram illustrating an example of a result 800 of the injection module 202 injecting a feature into an application. Before the injection module 202 injects the feature into the application, a target view (e.g., "targetView"), which is the view into which the feature is to be injected, is derived from a parent view (e.g., "parent"). The target view has four sub views (e.g., each called "subview"). After the injection module 202 injects the feature into the application, the target view has a new view (e.g., "featureView") corresponding to a view of the feature. As described above with respect to FIG. 2 and FIG. 3, the injection module 202 may inject the feature by adding a definition of the feature view (e.g., a view object for the feature) to a definition of the target view (e.g., a view object for the target view), enabling the application to create a view of the feature as a new sub-view of the target view. The injection module 202 may perform this injection of the feature lazily (e.g., based on a detecting that an instance (e.g., a first instance) of the target view is being created). Furthermore, the injection module 202 may perform this injection based on levers that turn the feature on or off for specific client systems or specific users, as described above with respect to FIGS. 2-3 and 6-7.

Figure 9:
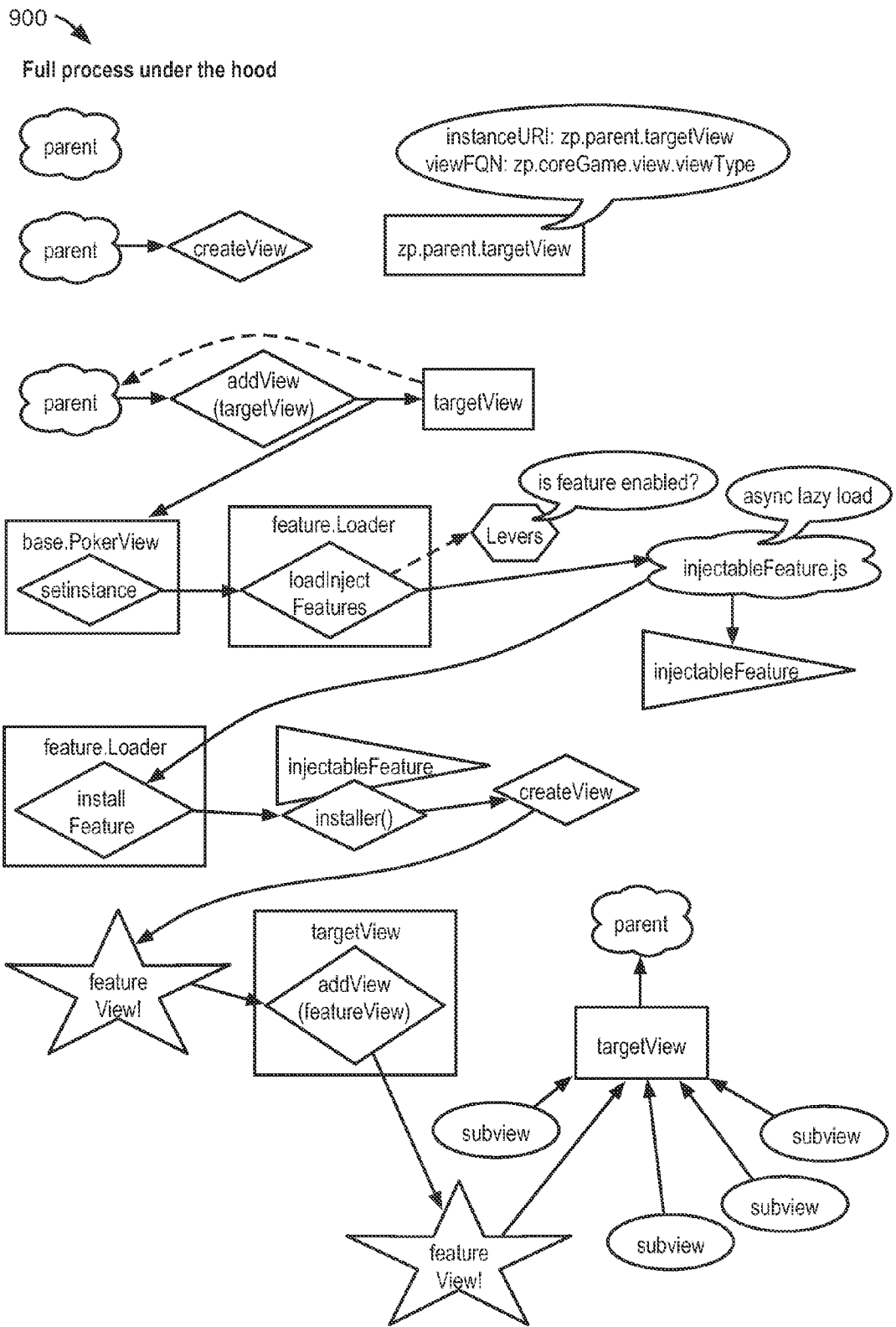
FIG. 9 is a block diagram illustrating an example embodiment of an implementation of a process of injecting a feature into a poker game application.

FIG. 9 is a block diagram illustrating an example embodiment of an implementation 900 of a process of injecting a feature into a poker game application. The levers module 208 detects that an instance of a target view object (e.g., "targetView") into which the feature may be injected is being created and added to a parent object of the target view. For example, the levers module 208 detects that a view creation ("e.g., createView") function and a view addition function (e.g., "addView") of a parent object (e.g., "parent") of the target view object have been called on the target view object.

When the target view object is created, it calls an instance setting function (e.g., "setInstance") that is configured to set the target view and its sub-views before the target view is added to the parent object. The set instance function, in turn, calls an injection-feature-loading function (e.g., a "loadInjectFeatures" of a "feature.Loader" object) that is configured to determine whether to load and install any injection features as sub-views of the target view. The injection-feature-loading function checks whether levers are turned on for any injection features, as described above with respect to FIG. 2-7. If the levers are turned on for an injection feature, the injection-feature-loading function calls a lazy-loading function (e.g., "injectableFeature.js"), which, in turn, calls an installation function (e.g., an "installFeature" function of the "feature-.Loader" object) to install an injection feature object (e.g., "injectableFeature") corresponding to the injection feature when the injection feature is needed.

The installation function calls a corresponding installation function (e.g., "installer( )") of the injection feature. The installation function of the injection feature calls a view creation function (e.g., "createView") of the targetView object to create an instance of a feature view (e.g., "featureView") object. The installation function of the injection feature then calls a view addition function (e.g., "addView") of the target-View to add the instance of the feature view object to the target view object as a sub-view of the target view object. Therefore, under certain circumstances (e.g., when the levers are on for an injection feature), when an instance of the target view is created, the target view creates an instance of the injection feature view as a sub-view of the target view.

For example, code is added to an initialization function of the parent object to create the instance of the view object (e.g., by calling a view creation (e.g., "createView") function of a base class). The code for creating the instance of the view object may specify a unique name (e.g., "zp.parent.target-View") for the view object. Programming code for adding the instance of the view object to the parent object as a sub-view of the parent object is then added to the code for the parent object. For example, code is added to the initialization function of the parent object to add the view object to the parent object as a sub-view (e.g., by calling a view addition (e.g., "addView") function of the parent object).

Figure 10:
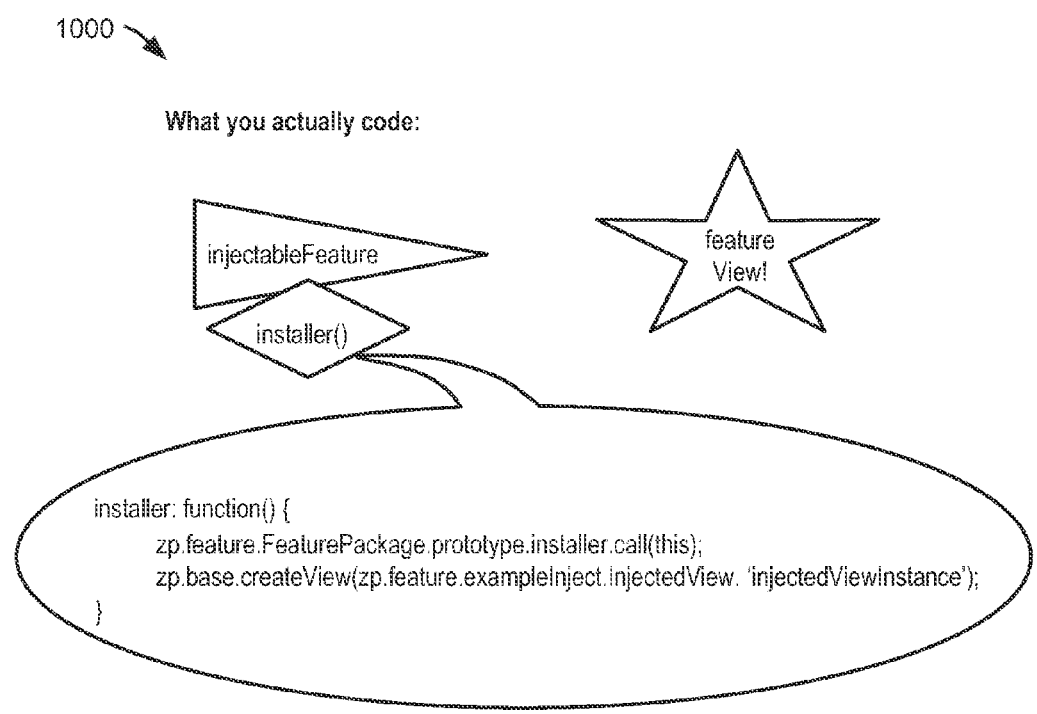
FIG. 10 is a block diagram illustrating an example embodiment of categories of programming code that a software developer creates to implement an injection feature.

FIG. 10 is a block diagram illustrating an example embodiment of categories of programming code 1000 that a software developer creates to implement an injection feature. The software developer creates programming code for the view of the feature (e.g., an object derived from a base view object for the application that includes specialized attributes, such as a specialized label). The software developer also creates package and an installation function (e.g., that creates an instance of the view object and adds it to an instance of a target view of the application). The programming code is further described below with respect to FIGS. 18A-22.

Figure 11A:
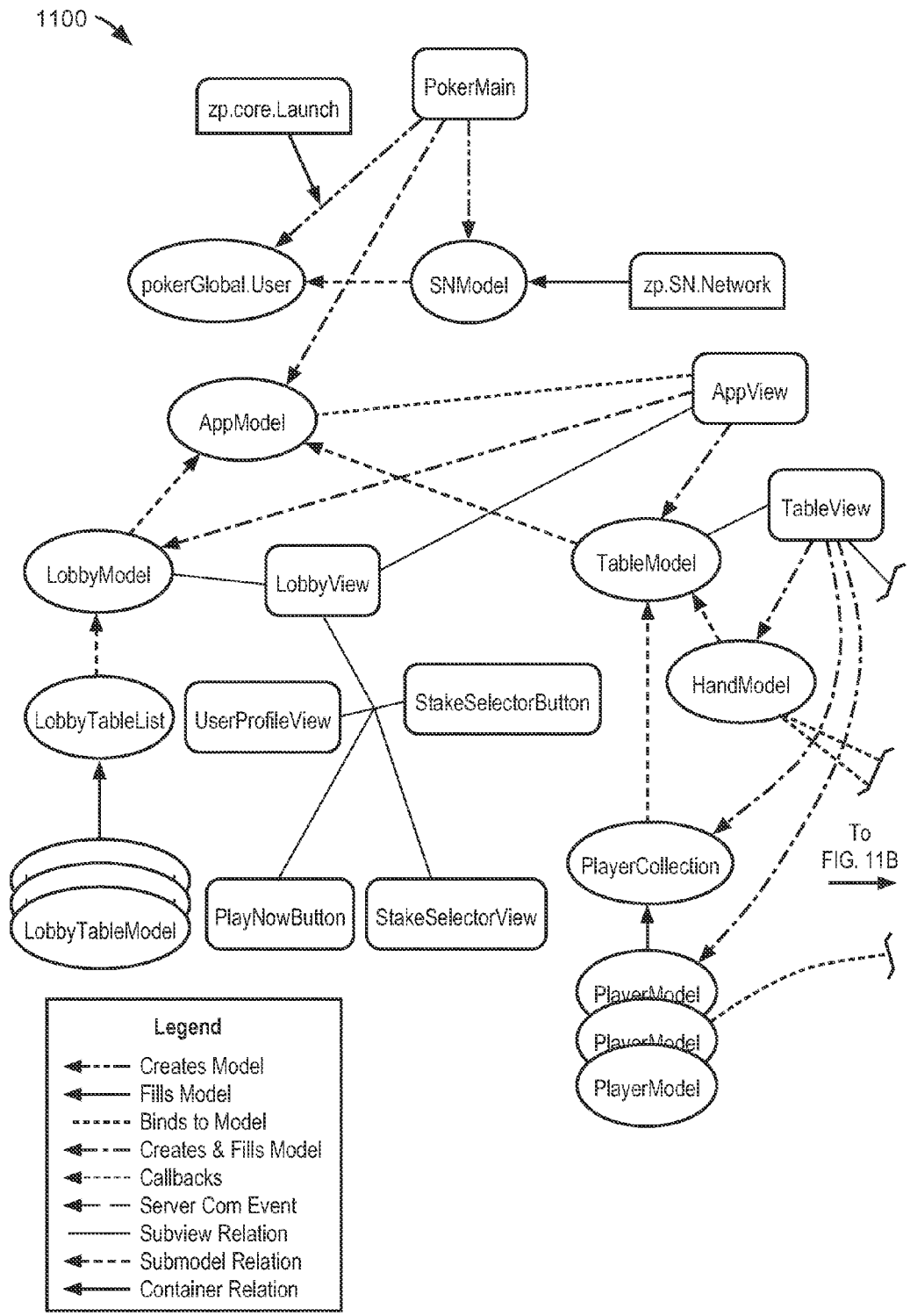
FIG. 11A and FIG. 11B are a block diagram illustrating an example embodiment of relationships between objects of a poker game application.
Figure 11B:
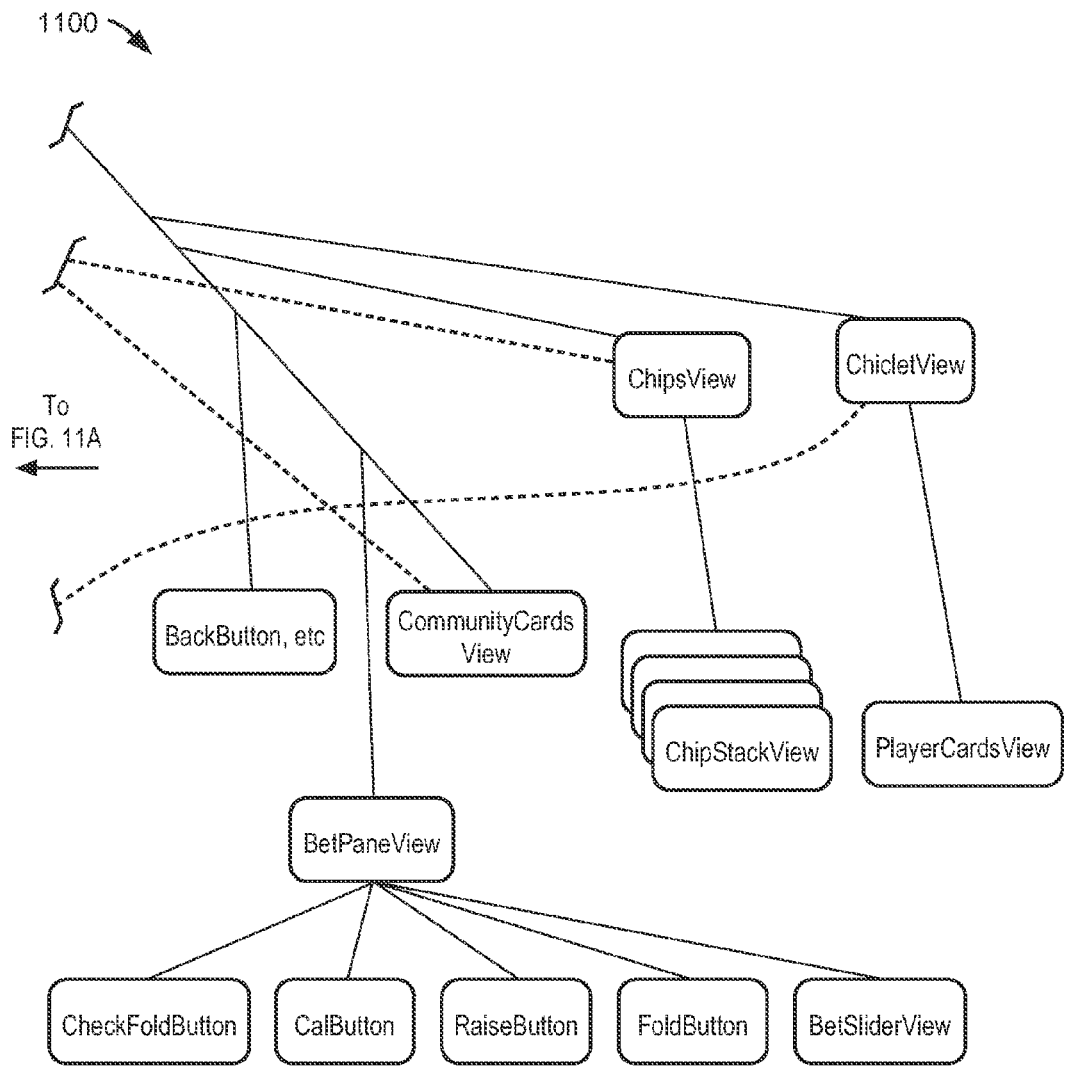

FIG. 11A and FIG. 11B are a block diagram illustrating an example embodiment of relationships 1100 between objects of a poker game application. The objects of the poker game application include model objects and view objects. These objects may correspond to the models and views of an MVC software architecture, as described above. For example, model objects include AppModel, LobbyModel, and LobbyTableModel objects for managing data pertaining to the poker game, a lobby of the poker game, and a table displayed in the lobby of the poker game, respectively. The view objects include AppView and TableView objects, which display a main (or application) view of the poker game application and a view of a poker table within the main view of the poker game application, respectfully.

Each object of the poker game application may each have one or more relationships with one or more additional objects of the poker game application. These relationships may indicate, for example, that a first object creates a second object, a first object fills a model of a second object, a first object binds to a second object, a first object creates and fills a second object, a first object calls back to a second object, a first object is a sub-object (e.g., a sub-view or a sub-model) of a second object, or a first object contains a second object. The legend identifies the line patterns used to identify the various relationships 1100 between the objects.

For example, multiple LobbyTableModel objects have sub-model relationships with a LobbyTableList object, which, in turn, has a sub-model relationship with a LobbyModel object. Additionally, the LobbyModel object has a sub-model relationship with an AppModel object, which, in turn, has a sub-model relationship with a pokerGlobal.User object. The pokerGlobal.User object is created by the PokerMain object, so the PokerMain object has a creator relationship with the pokerGlobal.User object. The PokerMain object also has a creator relationship with a SNModel object. Like the AppModel object, the SNModel object has a sub-model relationship with the pokerGlobal.User object. The zp.core-.Launch object has a fill relationship with the PokerGlobal-.User object. Filling may include configuring an instance of the PokerGlobal.User object (e.g., setting values of attributes of an instance).

View objects may bind to corresponding model objects. For example, the AppView object binds to the AppModel object, the TableView object binds to the TableModel object, the ChicletView object binds to multiple PlayerModel objects, and the ChipsView object and CommunityCards-View object bind to the HandModel object. View objects may create and fill other objects. For example, the AppView object creates and fills the TableModel object and the Lobby Model object, and the TableView object creates and fills the HandModel, PlayerCollection, and PlayerModel objects. Each view objects may have one or more sub-view relationships with other objects. For example, the LobbyView object is a sub-view object of the AppView object, and the UserProfile-View, PlayNowButton, StakeSelectorButton, and StakeSelectorView objects are sub-view objects of the LobbyView object. Similarly, the BarPaneView object is a sub-view of the TableView object and the CheckFoldButton, Call Button, RaiseButton, FoldButton, and BetSliderView button are sub-view objects of the BarPaneView object. And the PlayerCardsView object is a sub-view of the ChicletView object, and multiple ChipStackView objects are sub-view objects of the ChipsView object.

Figure 12:
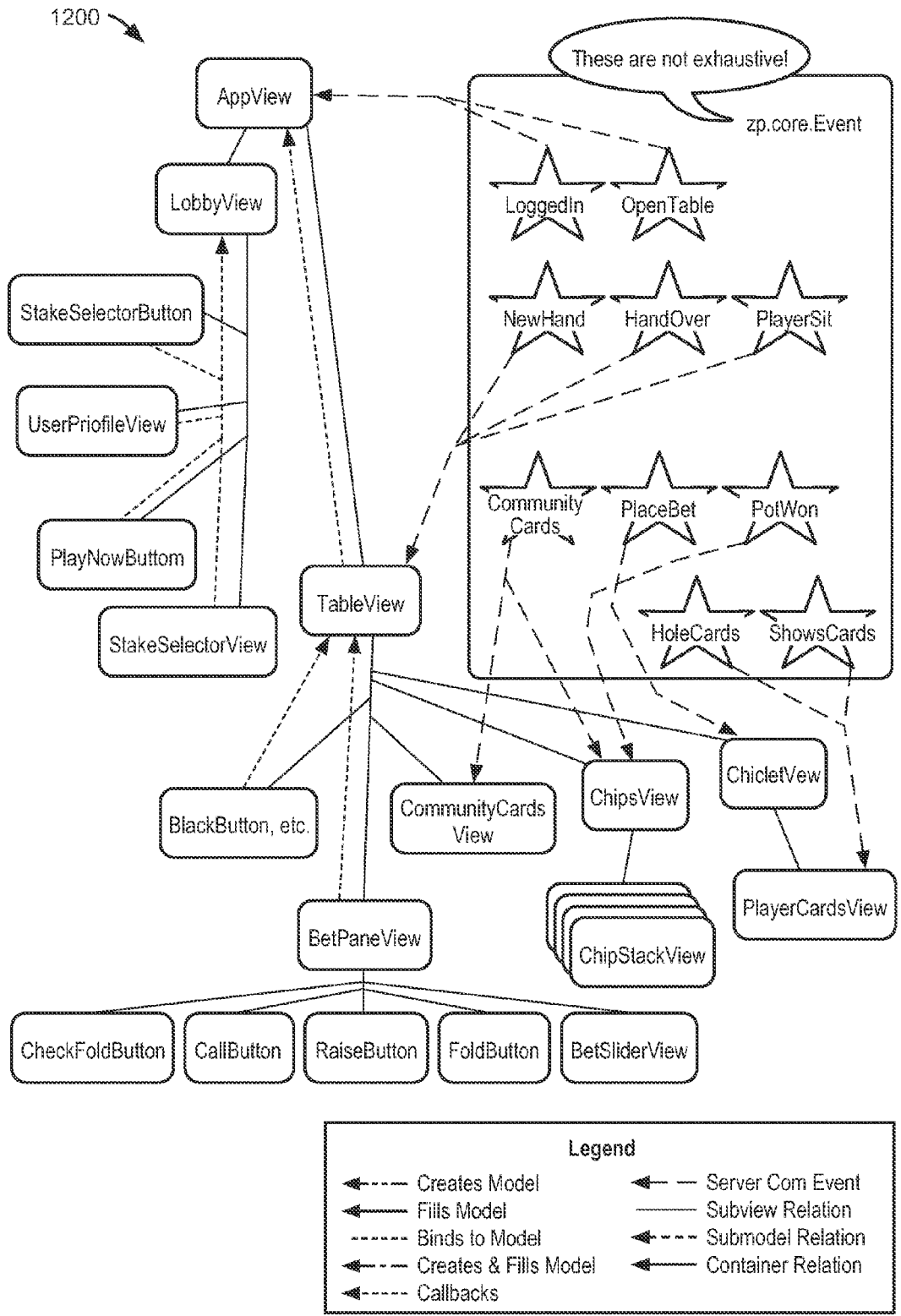
FIG. 12 is a block diagram illustrating an example embodiment of relationships between objects, events, and callbacks of a poker game application.

FIG. 12 is a block diagram illustrating an example embodiment of relationships 1200 between objects, events, and callbacks of a poker game application. Events may be managed by an events object (e.g., "zp.core.Event"), which may communicate the events to one or more view objects of the poker game application.

A non-exhaustive list of events includes LoggedIn (indicating that a player logged into the poker game), OpenTable (indicating that a player opened a table of the poker game), NewHand (indicating that a new hand is starting), HandOver (indicating that a hand has been completed), PlayerSit (indicating that a player sat down at a table), CommunityCards (indicating that one or more community cards have been dealt), PlaceBet (indicating that a player has placed a bet), PotWon (indicating that a player has won a pot), HoleCards (indicating that a player has received one or more hole cards), and ShowsCard (indicating that one or more previously hidden cards have been shown).

The legend identifies the line patterns used to identify the various relationships 1200 between the objects, events, and callbacks. For example, the AppView object receives notification of the LoggedIn and OpenTable events. The TableView object receives notification of the NewHand, HandOver, and PlayerSit events. The CommunityCardsView object and ChipsView object receive notification of the CommunityCards event. The ChipsView object also receives notification of the PotWon event. The PlayerCardsView object receives notification of the HoleCards and ShowsCards events.

Additionally, various objects may register callback functions with other objects (e.g., to be notified of changes to the other objects). For example, the BetPaneView object and view objects corresponding to navigation buttons (e.g., BackButton) may register callbacks with the TableView object. The UserProfileView, StakeSelectionButton, PlayNowButton, and StakeSelectorView may register callbacks with the LobbyView object.

Figure 13A:
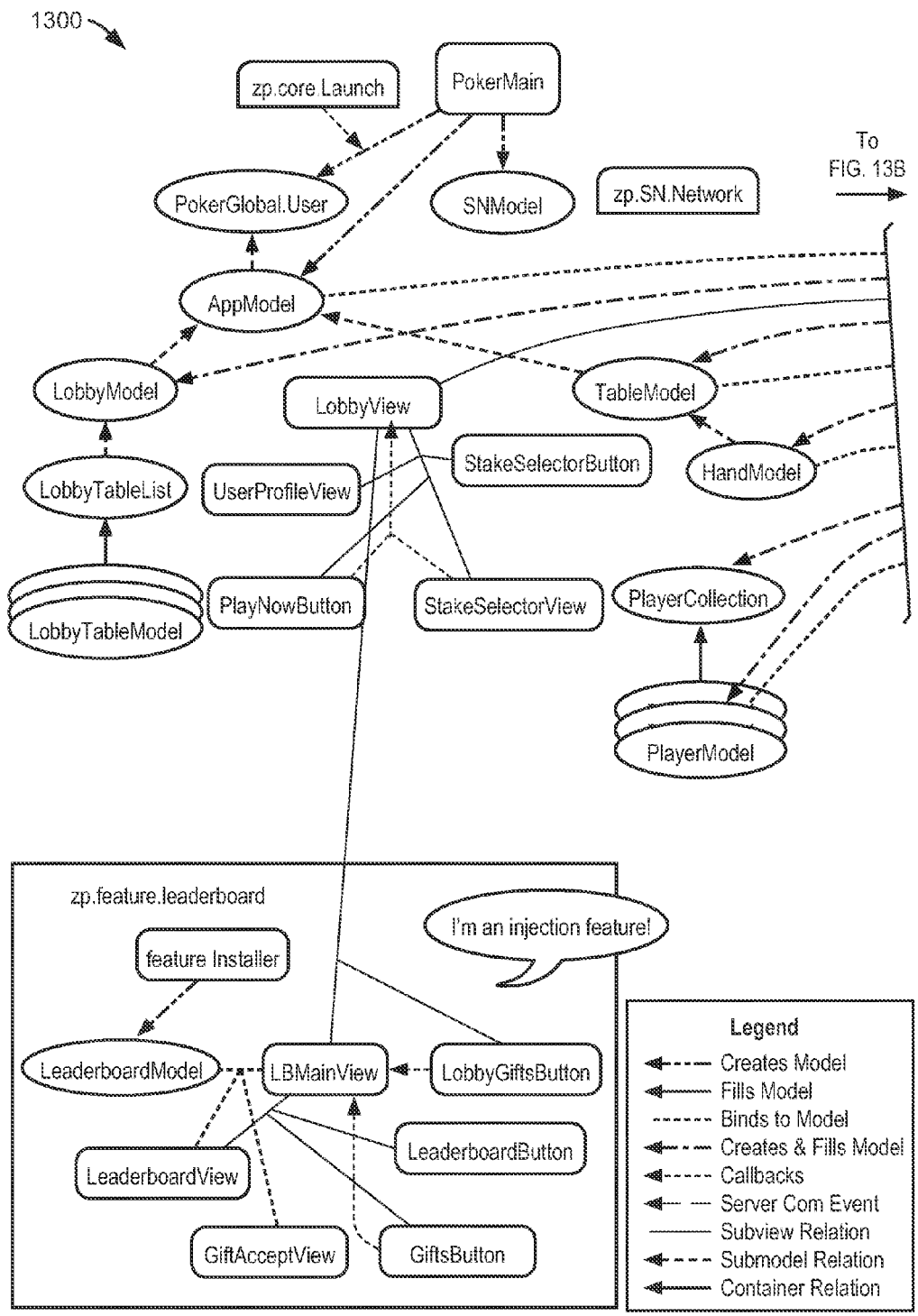
FIG. 13A and FIG. 13B are a block diagram illustrating an example embodiment of relationships between objects, events, and callbacks of a poker game application into which a leader board injection feature has been injected.
Figure 13B:
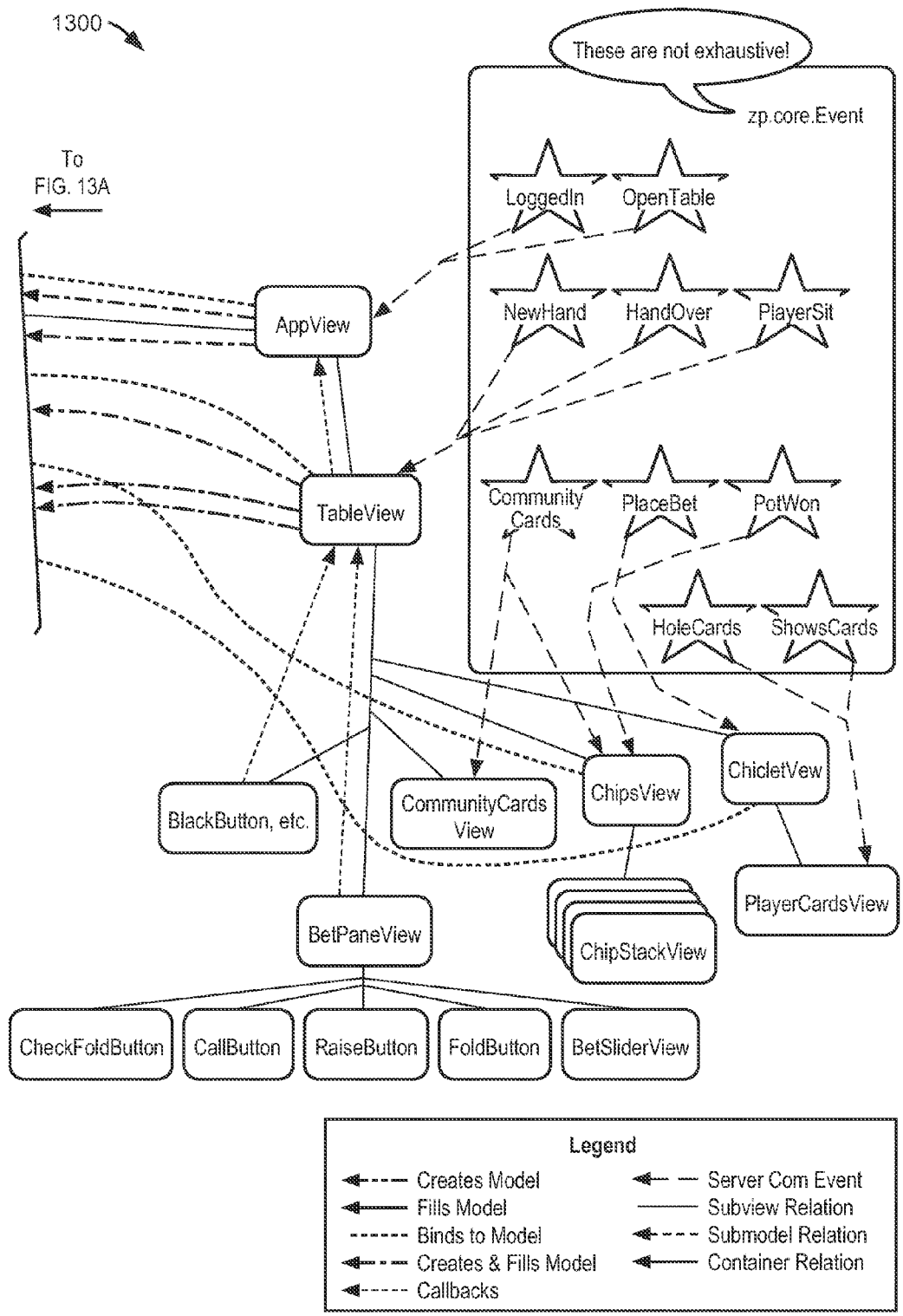

FIG. 13A and FIG. 13B are a block diagram illustrating an example embodiment of relationships 1200 between objects, events, and callbacks of a poker game application into which a leader board injection feature has been injected. Based on the injection of the injection feature, the view objects of the injection feature, the LBMainView and LobbyGiftsButton have sub-view relationships with the LobbyView object. Furthermore, the feature installer of the injection object creates and fills a LeaderboardModel object, which is bound to the LBMainView object and the GiftAcceptView object. The LeaderboardView, GiftsButton, and LeaderboardButton have a sub-view relationship with the LBMainView object. The LobbyGiftsButton, GiftsButton, and LeaderboardButton have registered callbacks with the LBMainView button.

Figure 14:
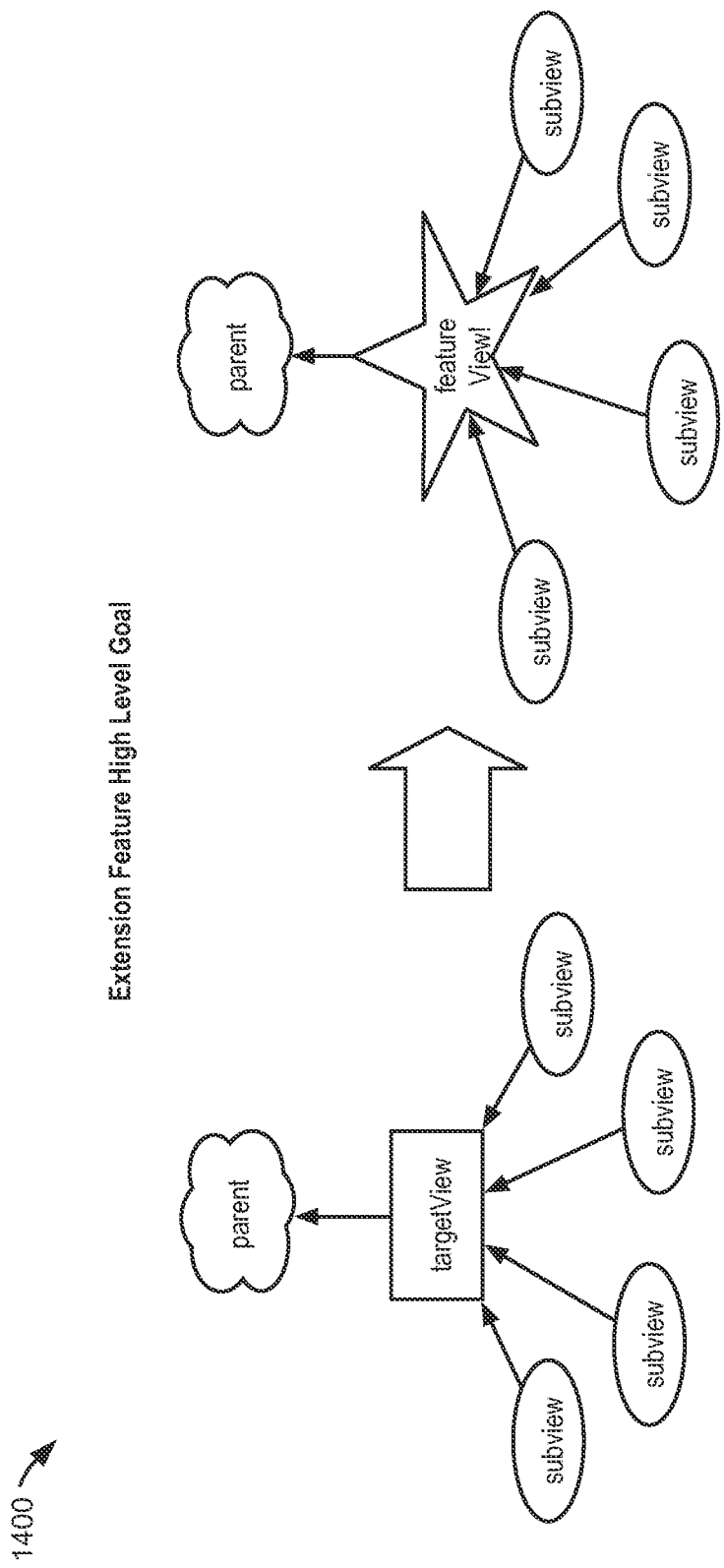
FIG. 14 is a block diagram illustrating an example of a result of the enhancement module incorporating a feature into an application.

FIG. 14 is a block diagram illustrating an example of a result 1400 of the enhancement module 204 incorporating a feature into an application. Here, a view of the application (e.g., "targetView") is replaced by a view of the enhancement feature (e.g., "featureView"). For example, the enhancement module 204 replaces all or a portion of a definition (e.g., a view object) of the target view with a definition (e.g., a view object) of the feature.

Figure 15:
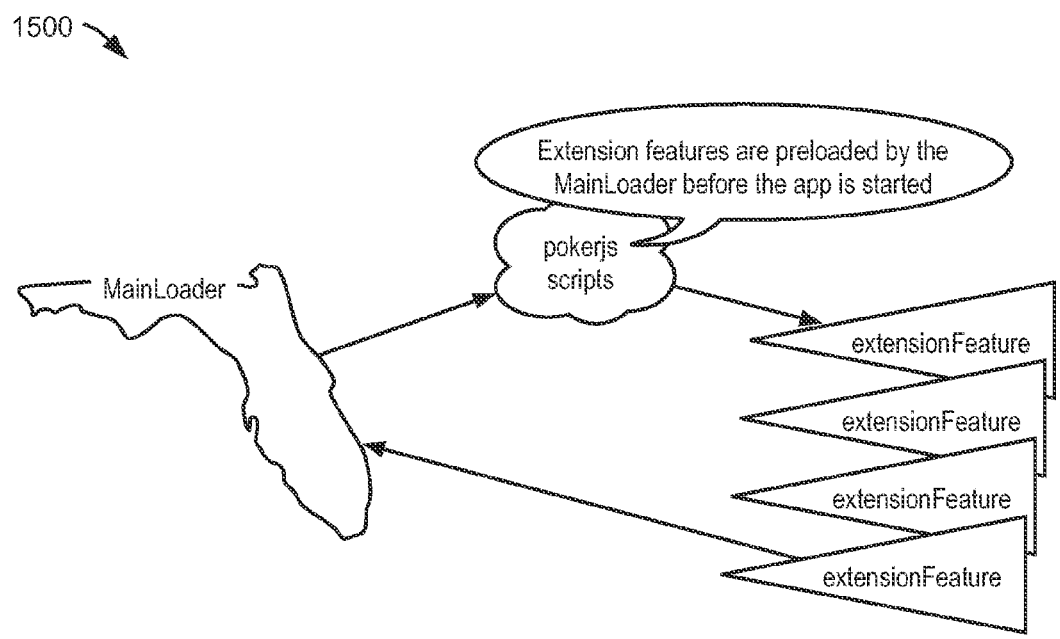
FIG. 15 is a block diagram illustrating an example embodiment of an implementation of a process of preloading enhancement features for a poker game application.

FIG. 15 is a block diagram illustrating an example embodiment of an implementation 1500 of a process of preloading enhancement features for a poker game application. A main loader function (e.g., "MainLoader") of the application calls various scripts (e.g., "pokerjs" scripts) to preload the definitions (e.g., view objects, model objects, or other data contained in a package for the feature). Thus, the extension features are preloaded by the main loader before the application is started. The preloading may be based on levers for the feature being on.

Figure 16:
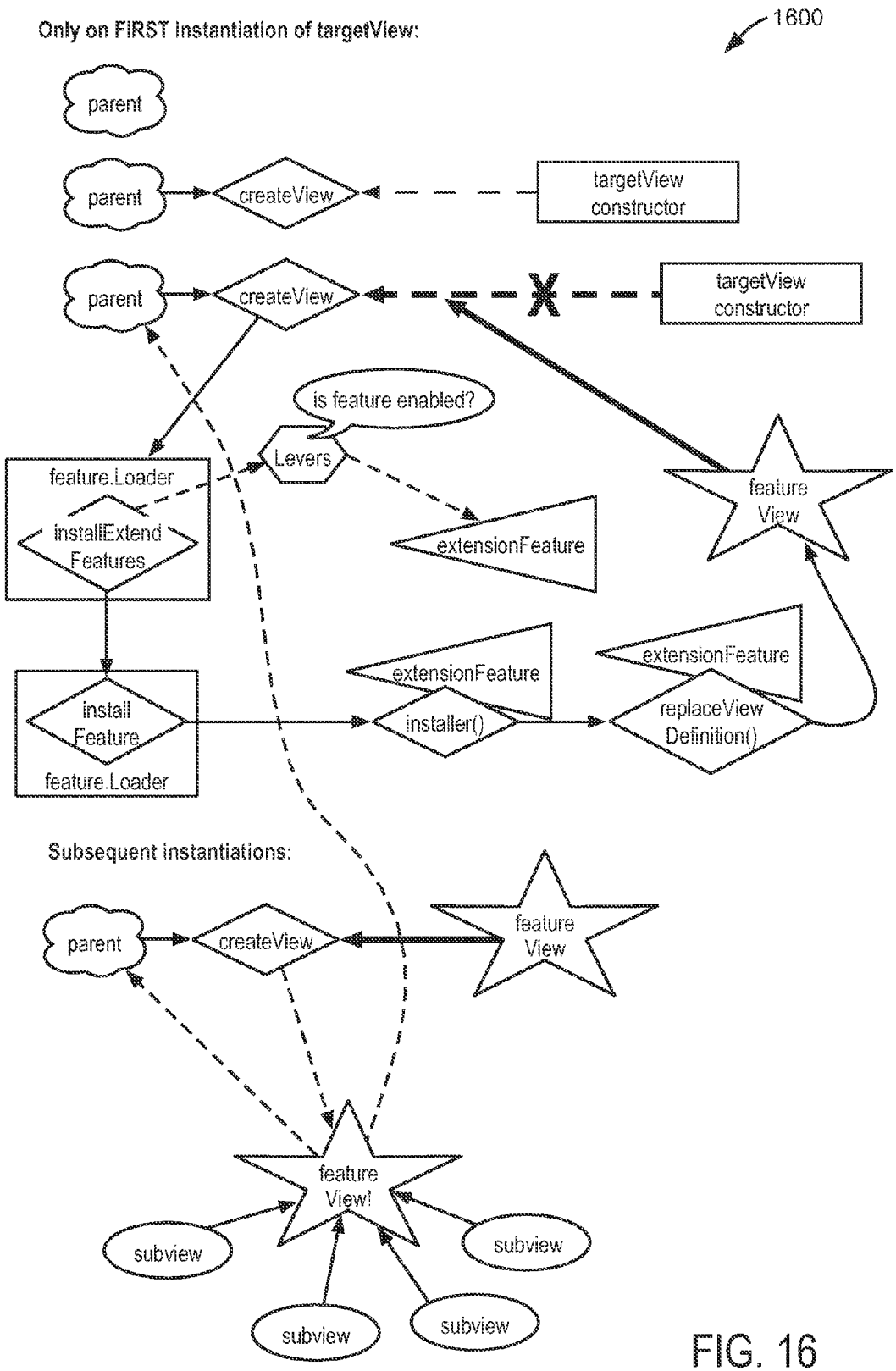
FIG. 16 is a block diagram illustrating an example embodiment of an implementation of a process of incorporating an enhancement feature into an application based on an instantiation of an instance of a target view.

FIG. 16 is a block diagram illustrating an example embodiment of an implementation 1600 of a process of incorporating an enhancement feature into an application based on an instantiation of an instance of a target view. Upon a first instantiation of the instance of the target view, the target view is created (e.g., when the "createView" function is called on the target view, a feature.Loader object determines whether the target view is to be replaced by the enhancement feature. For example, the feature.Loader object calls an extension-feature-installation function, which, in turn, determines whether the feature is enabled (e.g., whether levers for the feature have been turned on). If so, the featre.Loader object calls a feature installation (e.g., "installFeature") function, which, in turn, calls the installation function of the extension feature. The installation function of the extension feature replaces the definition of the target view with a definition of an extension feature view (e.g., "featureView"). For example, the installation function of the extension feature calls a "replaceViewDefinition( )" function. Then, instead of calling the constructor of the targetView, the application calls the constructor of the featureView.

Upon a second instantiation of the target view object, the constructor of the feature view is called is called instead of the constructor of the target view. In other words, in various embodiments, the feature.Loader object is not invoked again to determine whether to replace the target view with the feature view.

Figure 17:
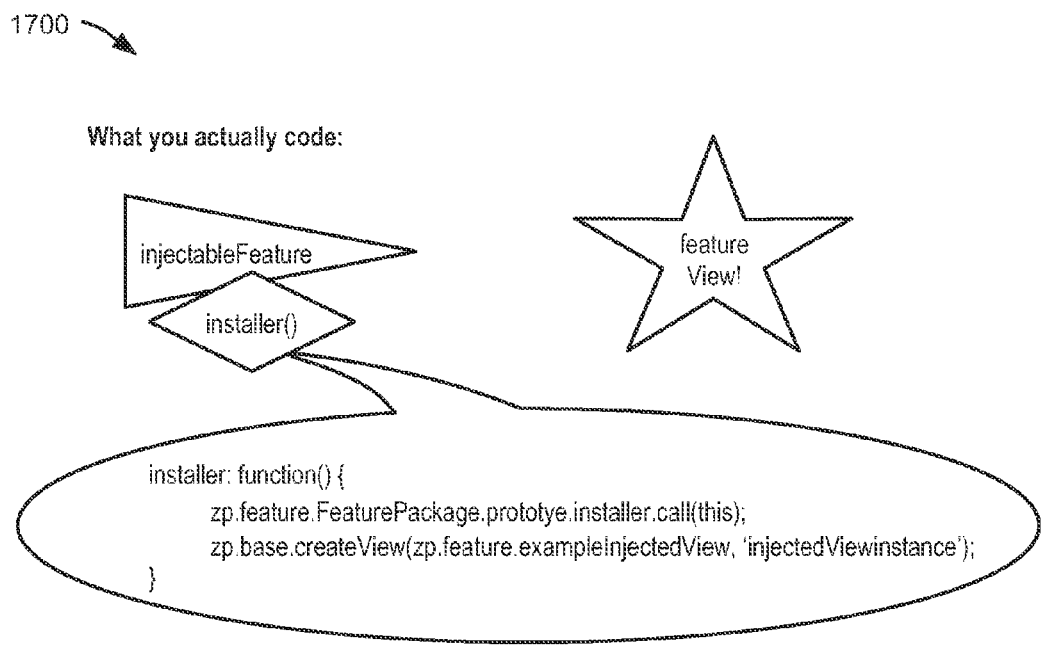
FIG. 17 is a block diagram illustrating an example embodiment of categories of programming code that a software developer creates to implement an injection feature.

FIG. 17 is a block diagram illustrating an example embodiment of categories of programming code 1700 that a software developer creates to implement an injection feature. The software developer creates programming code for the view of the feature (e.g., an object derived from a base view object for the application that includes specialized attributes, such as a specialized label). The software developer also creates package and an installation function (e.g., that creates an instance of the view object and adds it to an instance of a target view of the application). The programming code is further described below with respect to FIGS. 18A-22.

FIG. 18A is screenshot of a pseudo code 1800 that handles the installation of a package for an injection feature.

FIG. 18B is a screenshot of pseudo code 1860 that handles the installation of a package for an enhancement feature. The pseudo code stashes the old view reference in the feature package and replaces the definition of a view object with a new view.

FIG. 19 is a screenshot of pseudo code 1900 for a lever object that tags various features as being injection features or enhancement features for a view of the application. The pseudo code 1900 also demonstrates tagging of a feature as being a feature that is to be preloaded. The feature is a leader board (e.g., "leaderBoard") feature. For the zp.coreGame.lobby.LobbyView object of the application, the leader board feature is tagged as an extension feature and as a feature that is to be preloaded (e.g., before the starting of the application). For the zp.coreGame.lobby.LobbyView object of the application, the leaderboard feature is tagged as an extension feature. For the zp.lobbyInstance object of the application, the leader board feature is tagged as being an injection feature.

FIG. 20 is a screenshot of pseudo code 2000 for initializing a view of an application. First, the view is created using a base view (e.g., "zp.base.createView"). The models are passed in as a parameter of the function (e.g., "createView") used to create the view. Second, a constructor of the view object corresponding to the view is called. The constructor calls the parent view's constructor, passing in the view's instance name, component name, class name, model, and templates/css, if any. Third, a view initialization function is called. The initialization function calls the initialization function of the parent object. The function returns when all asset dependencies have been loaded. The view is initialized. For example, the position, text, and so on of the view is set. Additionally, sub-views are added.

FIG. 21 is a screenshot of pseudo code 2100 for creating a sub-view. First, in a parent object of the sub-view, the sub-view is created. For example, the sub-view is created in an initialization function of the parent. Second, the view is added to the parent. The view instance is given a unique name.

FIG. 22 is a screenshot of pseudo code 2200 of an injection feature definition that adds a funny button to a lobby of a poker game application. First, a view for the feature is created. Second, the package and installer is created. The injection of the feature is accomplished by the installer. Third, the levers for the feature are defined (e.g., in a levers object for the poker game application).

Figure 23:
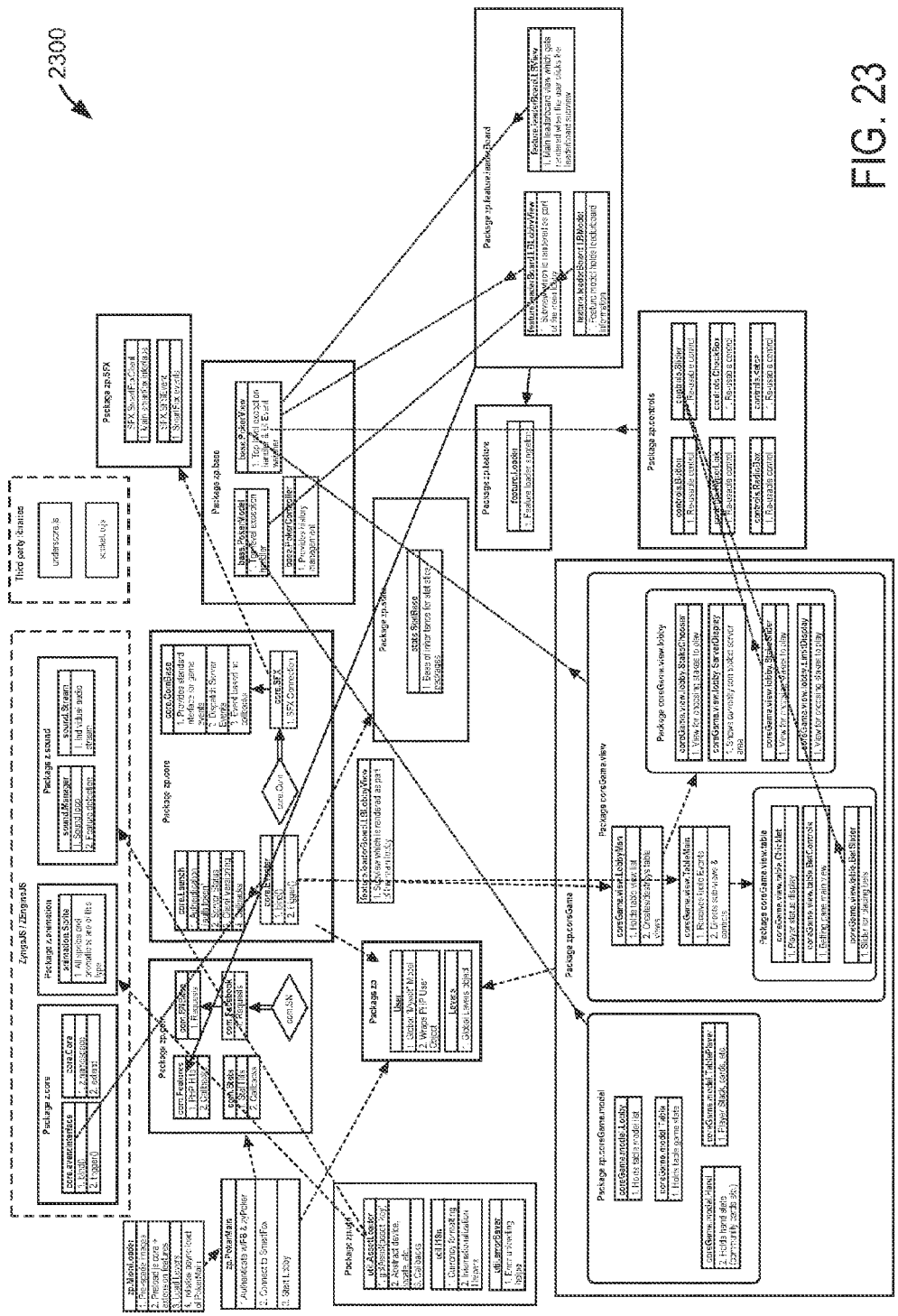
FIG. 23 is a block diagram illustrating example relationships between various packages and java scripts that correspond to a poker game application.

FIG. 23 is a block diagram illustrating example relationships 2300 between various packages and java scripts that correspond to a poker game application.

Data Flow

Figure 24:
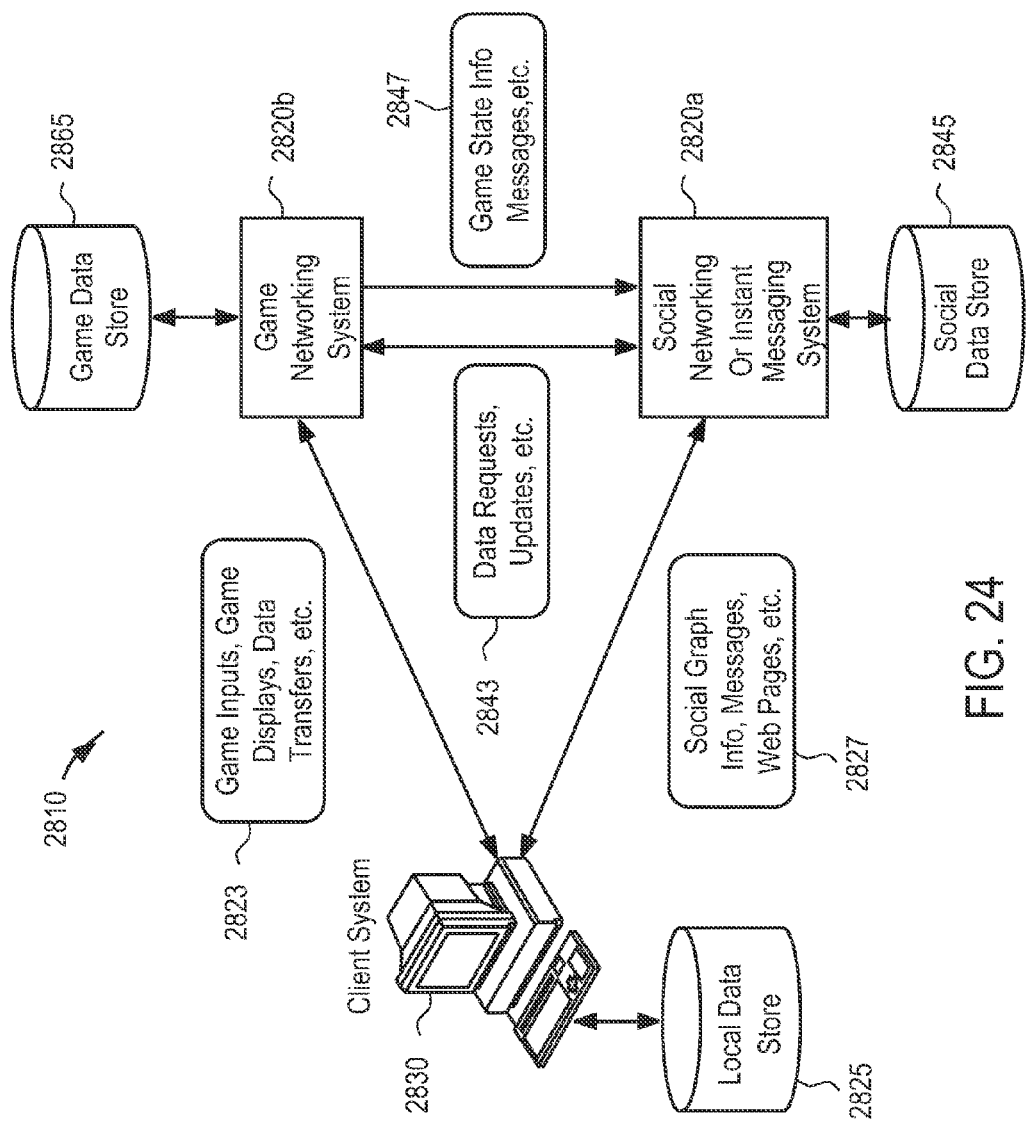
FIG. 24 is a block diagram illustrating an example data flow between the components of system.

FIG. 24 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 527 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820b can also de-serialize the BLOB to resolve the game state parameters and execute its own game logic based on the events in the batch file of events transmitted by the client to synchronize the game state on the server side. Game networking system 2820b may then re-serialize the game state, now modified, into a BLOB and pass this to a memory cache layer for lazy updates to a persistent database.

With a client-server environment in which the online games may run, one server system, such as game networking system 2820b, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820b for further processing. In addition, multiple client systems 2830 may transmit other types of application data to game networking system 2820b.

In particular embodiments, a computed-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 520*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820*b* may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 25:
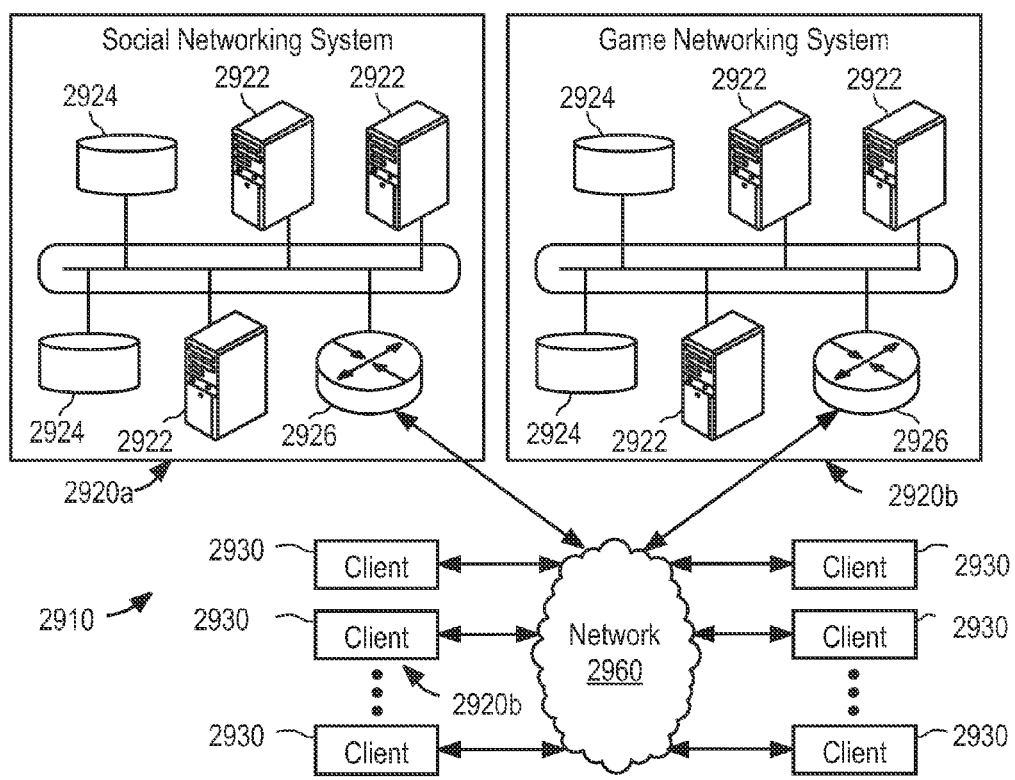
FIG. 25 is a block diagram illustrating an example network environment, in which various example embodiments may operate.

Particular embodiments may operate in a wide area network environment, such as the Internet, including multiple network addressable systems. FIG. 25 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 29 illustrates, particular embodiments may operate in a network environment comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment via a network service provider, a wireless carrier, or any other suitable means.

Networking system 2920 is a network addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing device 2930. The request may also include location information identifying a geographic location of the user's client system or a logical network location of the user's client system. The request may also include a timestamp identifying when the request was transmitted.

Although the example network environment 2910 described above and illustrated in FIG. 25 described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 26:
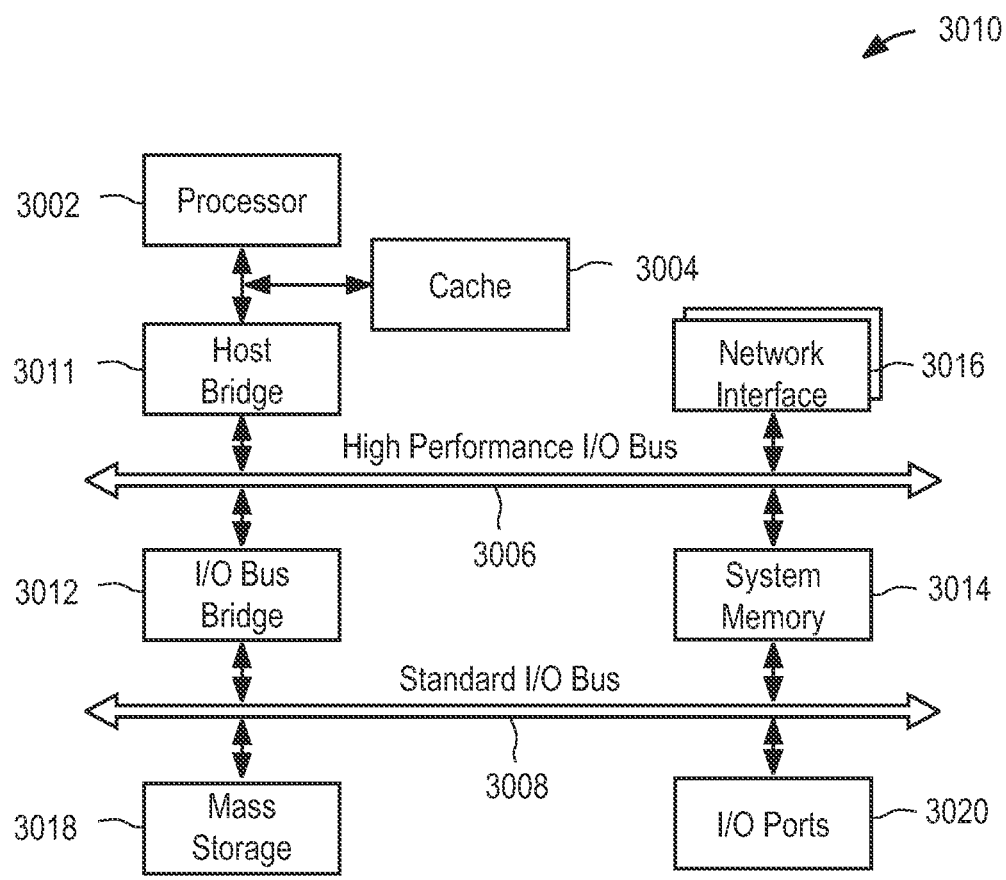
FIG. 26 is a block diagram illustrating an example computing system architecture, which may be used to implement a server or a client system.

FIG. 26 is a block diagram illustrating an example computing system architecture, which may be used to implement a server 2922 or a client system 2930. In one embodiment, hardware system 3010 comprises a processor 3002, a cache memory 3004, and one or more executable modules and drivers, stored on a tangible computer readable medium, directed to the functions described herein. Additionally, hardware system 3010 may include a high performance input/output (I/O) bus 3006 and a standard I/O bus 3008. A host bridge 3011 may couple processor 3002 to high performance I/O bus 706, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures and various components of hardware system 3010 may be rearranged. For example, cache 3004 may be on-chip with processor 3002. Alternatively, cache 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The invention claimed is:

1. A method comprising:
receiving a definition of a feature of an application executing on a client device;
determining, based on a lever included in the definition, that the feature is one of an injection feature that includes a sub-view that is to be injected into a view of the application and an enhancement feature that includes an additional view that is replace the view of the application, the lever associated with a type of the client device; and
performing one of injecting the feature into the view of the application and enhancing the view of the application based on the determining that the feature is the one of the injection feature and the enhancement feature, the injecting of the feature including creating the sub-view of the view and the enhancing of the view including replacing the view with the additional view, wherein the one of the injecting of the feature and the enhancing of the view is performed by a processor.

2. The method of claim 1, wherein the lever is generated at a server based on capabilities of the type of the device.

3. The method of claim 2, wherein the lever is specific to at least one of information pertaining to a user of the application and information pertaining to a device that is accessing the application.

4. The method of claim 1, wherein the definition of the feature includes an installer and the injection of the feature includes invoking the installer.

5. The method of claim 1, further comprising:
detecting that an instance of the view of the application is to be loaded; and
wherein the performing of the one of the injecting of the feature and the enhancing of the view is based on the detecting.

6. A non-transitory machine readable storage medium storing a set of instructions that, when executed by at least one processor, causes the at least one processor to perform operations comprising:
receiving a definition of a feature of an application executing on a client device;
determining, based on a lever included in the definition, that the feature is one of an injection feature that includes a sub-view that is to be injected into a view of the application and an enhancement feature that includes an additional view that is replace the view of the application, the lever associated with a type of the client device; and
performing one of injecting the feature into the view of the application and enhancing the view of the application based on the determining that the feature is the one of the injection feature and the enhancement feature, the injecting of the feature including creating the sub-view of the view and the enhancing of the view including replacing the view with the additional view.

7. The non-transitory machine readable storage medium of claim 6, wherein the definition is generated at a server based on capabilities of the type of the client device.

8. The non-transitory machine readable storage medium of claim 7, wherein the lever is specific to at least one of information pertaining to a user of the application and information pertaining to a device that is accessing the application.

9. The non-transitory machine readable storage medium of claim 6, wherein the definition of the feature includes an installer and the injection of the feature includes invoking the installer.

10. The non-transitory machine readable storage medium of claim 6, further comprising:
detecting that an instance of the view of the application is to be loaded; and
wherein the performing of the one of the injecting of the feature and the enhancing of the view is based on the detecting.

11. A system comprising one or more processor-implemented modules, the one or more processor-implemented modules configured to:
receive a definition of a feature of an application executing on a client device;
determine, based on a lever included in the definition, that the feature is one of an injection feature that includes a sub-view that is to be injected into a view of the application and an enhancement feature that includes an additional view that is replace the view of the application, the lever associated with a type of the client device;
perform one of injecting the feature into the view of the application and enhancing the view of the application based on the determining that the feature is the one of the injection feature and the enhancement feature, the injecting of the feature including creating the sub-view of the view and the enhancing of the view including replacing the view with the additional view.

12. The system of claim 11, wherein the definition is generated at a server based on capabilities of the type of the client device.

13. The system of claim 11, wherein the definition of the feature includes an installer and the processor-implemented injection module is further configured to inject the feature by invoking the installer.

14. The system of claim 11, wherein the one or more processor-implemented modules are further configured to:
detect that an instance of the view of the application is to be loaded; and
wherein the one of the injecting of the feature into the view of the application the enhancing of the view of the application is based on the detecting.

* * * * *

UNITED STATES PATENT AND TRADEMARK OFFICE
CERTIFICATE OF CORRECTION

PATENT NO. : 8,949,781 B1  
APPLICATION NO. : 13/270157  
DATED : February 3, 2015  
INVENTOR(S) : Orcutt et al.

Page 1 of 1

It is certified that error appears in the above-identified patent and that said Letters Patent is hereby corrected as shown below:

In the Specification

In column 1, line 33, delete "dynamic" and insert --Dynamic--, therefor

In column 1, line 62, delete "application:" and insert --application;--, therefor In column 2, line 7, delete "application:" and insert --application;--, therefor In column 2, line 23, delete "leader board" and insert --leaderboard--, therefor In column 8, line 53, delete "201" and insert --202--, therefor In column 10, line 11, delete "/lobby/" and insert --//lobby/--, therefor In column 10, line 15, delete "/leaberboard/images/" and insert --/leaderboard/images/--, therefor In column 10, line 26, delete "lobby/" and insert --/lobby/--, therefor In column 10, line 50-51, delete "pre-loading." and insert --preloading.--, therefor In column 10, line 51, delete "pre-loading" and insert --preloading--, therefor In column 16, line 36, delete "Call Button," and insert --CallButton,--, therefor In column 17, line 55, delete "featre.Loader" and insert --feature.Loader--, therefor In the Claims In column 28, line 22, in Claim 11, delete "device;" and insert --device; and--, therefor Signed and Sealed this  
Fifteenth Day of September, 2015

Michelle K. Lee  
*Director of the United States Patent and Trademark Office*